(12) United States Patent
Srinivasan et al.

(10) Patent No.: US 11,462,220 B2
(45) Date of Patent: Oct. 4, 2022

(54) INFRASTRUCTURE AUTOMATION PLATFORM TO ASSIST IN PERFORMING ACTIONS IN RESPONSE TO TASKS

(71) Applicant: Accenture Global Solutions Limited, Dublin (IE)

(72) Inventors: Madhan Kumar Srinivasan, Bengaluru (IN); Sumanta Kayal, West Bengal (IN); Moushom Borah, Assam (IN); Abhijit Ghosh, West Bengal (IN)

(73) Assignee: Accenture Global Solutions Limited, Dublin (IE)

( * ) Notice: Subject to any disclaimer, the term of this patent is extended or adjusted under 35 U.S.C. 154(b) by 313 days.

(21) Appl. No.: 16/809,078

(22) Filed: Mar. 4, 2020

(65) Prior Publication Data

US 2021/0280195 A1 Sep. 9, 2021

(51) Int. Cl.
| | |
|---|---|
| *G10L 17/00* | (2013.01) |
| *G06F 16/23* | (2019.01) |
| *G06N 5/04* | (2006.01) |
| *G06N 20/00* | (2019.01) |
| *G06V 40/16* | (2022.01) |

(52) U.S. Cl.
CPC .......... *G10L 17/00* (2013.01); *G06F 16/2379* (2019.01); *G06N 5/04* (2013.01); *G06N 20/00* (2019.01); *G06V 40/172* (2022.01)

(58) Field of Classification Search
CPC ........ G06F 3/167; G06F 8/41; G06F 16/2379; G06F 21/57; G06F 40/30; G06F 3/0346; G06F 9/4881; G06F 11/2023; G06F 21/6245; G06F 40/289; G06K 9/6259; G06N 3/006; G06N 5/003; G06N 5/04; G06N 5/045; G06N 5/046; G06N 20/00; G06N 20/20; G06N 3/08; G06N 3/084; G06N 5/022; G06N 7/005; G06V 40/172; G06V 40/28; G10L 15/22; G10L 15/183; G10L 17/00; G10L 15/18; G10L 15/30; H04L 51/02; H04L 63/08; H04L 67/53; H04W 12/12; H04W 4/70; H04W 64/00;
(Continued)

(56) References Cited

U.S. PATENT DOCUMENTS

| | | |
|---|---|---|
| 5,842,193 A | 11/1998 | Reilly |
| 8,543,998 B2 | 9/2013 | Barringer |

(Continued)

FOREIGN PATENT DOCUMENTS

WO 2019/005348 A1 1/2019

*Primary Examiner* — Gerald Gauthier
(74) *Attorney, Agent, or Firm* — Harrity & Harrity, LLP

(57) ABSTRACT

A device may receive user personalized data and user activity data identifying tasks and actions performed by a user, and may perform natural language processing on the user personalized data and the user activity data to generate processed textual data. The device may train machine learning models based on the processed textual data to generate trained machine learning models, and may receive, from a client device, a command identifying a particular task to be performed. The device may process the command and the user activity data, with the trained machine learning models, to determine whether a particular action in the user activity data correlates with the particular task. The device may perform actions when the particular action correlates with the particular task.

20 Claims, 22 Drawing Sheets

(58) Field of Classification Search
CPC ......... A61B 5/02438; G06Q 10/06398; G06Q 10/103; G06Q 30/0269
USPC .......................................... 704/235, 246, 275
See application file for complete search history.

(56) References Cited

U.S. PATENT DOCUMENTS

| | | | |
|---|---|---|---|
| 8,892,419 | B2 | 11/2014 | Lundberg et al. |
| 10,802,848 | B2* | 10/2020 | Liu ........................ G06V 40/28 |
| 10,909,980 | B2* | 2/2021 | Nadimpalli .............. G06N 5/04 |
| 11,093,853 | B2* | 8/2021 | Attenberg .............. G06N 20/00 |
| 11,272,026 | B2* | 3/2022 | Walsh ..................... H04L 63/08 |
| 2016/0163311 | A1* | 6/2016 | Crook ................... G10L 15/183 |
| | | | 704/275 |
| 2016/0379638 | A1* | 12/2016 | Basye ..................... G10L 15/22 |
| | | | 704/235 |
| 2017/0329466 | A1 | 11/2017 | Krenkler et al. |
| 2017/0352352 | A1* | 12/2017 | Wang ...................... G10L 15/30 |
| 2018/0101923 | A1* | 4/2018 | Griesmann ........... H04W 64/00 |
| 2018/0131904 | A1 | 5/2018 | Segal |
| 2018/0137856 | A1 | 5/2018 | Gilbert |
| 2018/0247648 | A1 | 8/2018 | Nadimpalli et al. |
| 2018/0336009 | A1* | 11/2018 | Yoganandan ......... G06F 3/0346 |
| 2019/0018694 | A1* | 1/2019 | Rhodes ................... G10L 15/18 |
| 2019/0034813 | A1* | 1/2019 | Das ........................ G06N 5/046 |
| 2019/0068627 | A1* | 2/2019 | Thampy ................ H04W 12/12 |
| 2019/0147905 | A1* | 5/2019 | Mai ..................... G06F 21/6245 |
| | | | 704/275 |
| 2019/0205386 | A1* | 7/2019 | Kumar .................... G06F 40/30 |
| 2019/0238358 | A1* | 8/2019 | Hurewitz ................ H04W 4/70 |
| 2020/0026733 | A1* | 1/2020 | Bagley, Jr. .............. G06F 3/167 |
| 2020/0092243 | A1* | 3/2020 | Milligan ................. H04L 51/02 |
| 2020/0125586 | A1* | 4/2020 | Rezaeian ................ G06N 5/04 |
| 2020/0193265 | A1* | 6/2020 | Hill .......................... G06N 5/04 |
| 2020/0209964 | A1* | 7/2020 | Amstutz ............ A61B 5/02438 |
| 2020/0294108 | A1* | 9/2020 | Perry ..................... G06N 20/00 |
| 2020/0310749 | A1* | 10/2020 | Miller .................. G06F 9/4881 |
| 2020/0311210 | A1* | 10/2020 | Nama .................. G06F 40/289 |
| 2021/0012266 | A1* | 1/2021 | Stenning ........... G06Q 10/06398 |
| 2021/0064388 | A1* | 3/2021 | Gardner ................ G06N 20/00 |
| 2021/0081377 | A1* | 3/2021 | Polleri .................... H04L 9/088 |
| 2021/0081819 | A1* | 3/2021 | Polleri ................... G06N 3/006 |
| 2021/0081837 | A1* | 3/2021 | Polleri ...................... G06F 8/41 |
| 2021/0081848 | A1* | 3/2021 | Polleri ................. G06K 9/6259 |
| 2021/0133670 | A1* | 5/2021 | Cella ........................ G06N 5/04 |
| 2021/0201237 | A1* | 7/2021 | Boddu ............... G06Q 30/0269 |
| 2021/0280195 | A1* | 9/2021 | Srinivasan ............... G06N 5/04 |
| 2022/0036302 | A1* | 2/2022 | Cella .................... G06Q 10/103 |

\* cited by examiner

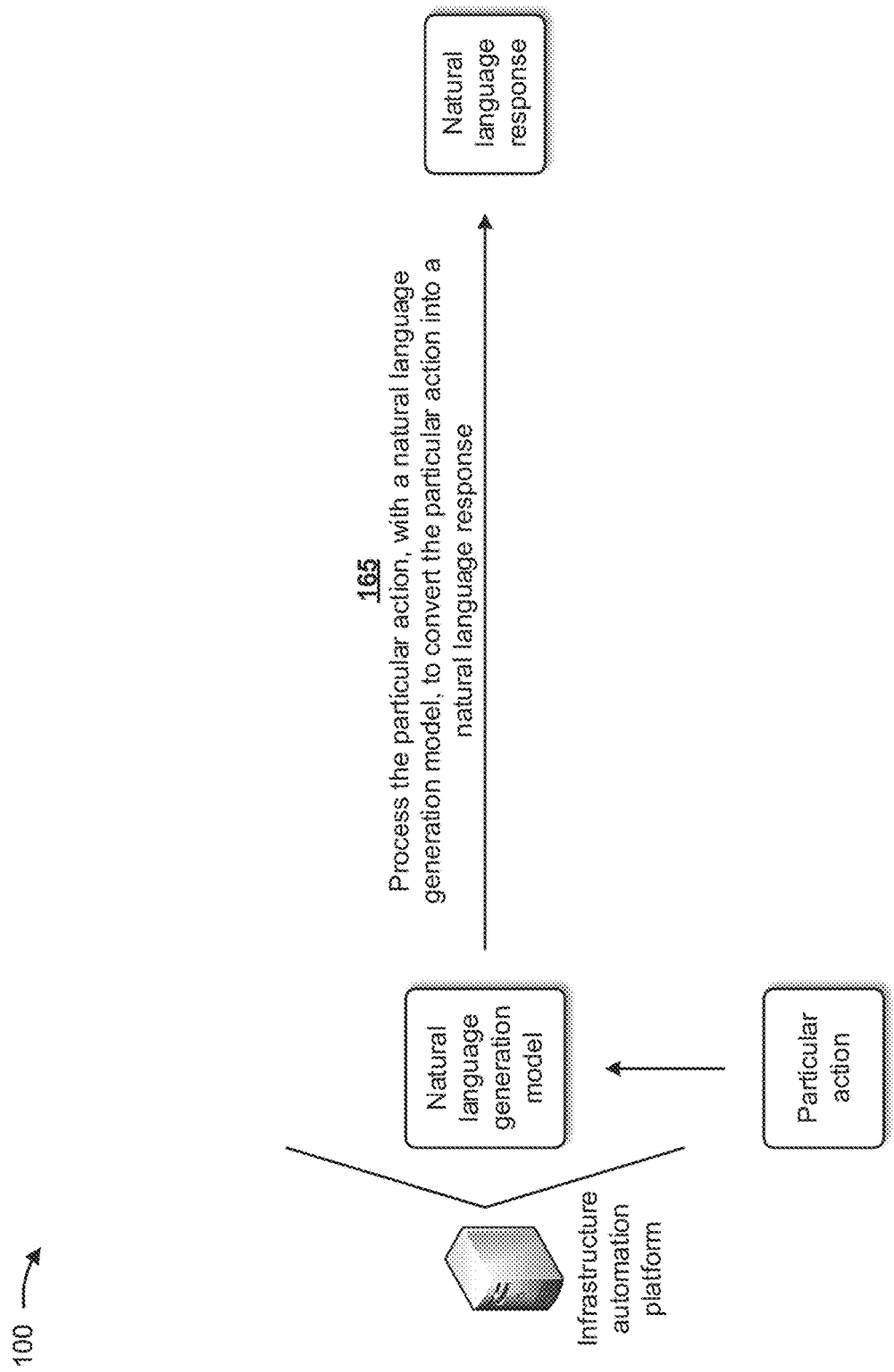

INFRASTRUCTURE AUTOMATION PLATFORM TO ASSIST IN PERFORMING ACTIONS IN RESPONSE TO TASKS

BACKGROUND

Some entities utilize a workforce of software developers, network administrators, network technicians, and/or the like to provide service to systems, networks, network devices, software, and/or the like utilized by the entities.

SUMMARY

According to some implementations, a method may include receiving, from a client device associated with a user, user personalized data about the user and user activity data identifying tasks of the user and actions performed by the user in response to the tasks, and performing natural language processing on the user personalized data and the user activity data to generate processed textual data identifying the user personalized data, the tasks, and the actions. The method may include training one or more machine learning models based on the processed textual data to generate one or more trained machine learning models that identify particular actions based on particular tasks, and receiving, from the client device, a command identifying a particular task to be performed. The method may include processing the command and the user activity data, with the one or more trained machine learning models, to determine whether a particular action in the user activity data correlates with the particular task. The method may include performing one or more actions based on the particular action and when the particular action in the user activity data correlates with the particular task.

According to some implementations, a device may include one or more memories, and one or more processors to receive, from a client device associated with a user, a command identifying a particular task to be performed. The one or more processors may process the command and user activity data identifying tasks of the user and actions performed by the user in response to the tasks, with one or more machine learning models, to determine whether a particular action in the user activity data correlates with the particular task. The one or more machine learning models may be trained to identify particular actions based on particular tasks, user personalized data about the user, and the user activity data. The one or more processors may perform one or more actions based on the particular action and when the particular action in the user activity data correlates with the particular task.

According to some implementations, a non-transitory computer-readable medium may store one or more instructions that, when executed by one or more processors of a device, may cause the one or more processors to receive, from a client device associated with a user, user personalized data about the user and user activity data identifying tasks of the user and actions performed by the user in response to the tasks, and perform natural language processing on the user personalized data and the user activity data to generate processed textual data identifying the user personalized data, the tasks, and the actions. The one or more instructions may cause the one or more processors to train one or more machine learning models based on the processed textual data to generate one or more trained machine learning models that identify particular actions based on particular tasks, and receive, from the client device, a command identifying a particular task to be performed. The one or more instructions may cause the one or more processors to process the command, with a first trained machine learning model of the one or more trained machine learning models, to identify an intended task of the command. The one or more instructions may cause the one or more processors to process the intended task and the user activity data, with a second trained machine learning model of the one or more trained machine learning models, to determine whether a particular action in the user activity data correlates with the intended task, and perform one or more actions based on the particular action and when the particular action in the user activity data correlates with the particular task.

DETAILED DESCRIPTION

Figure 1A:
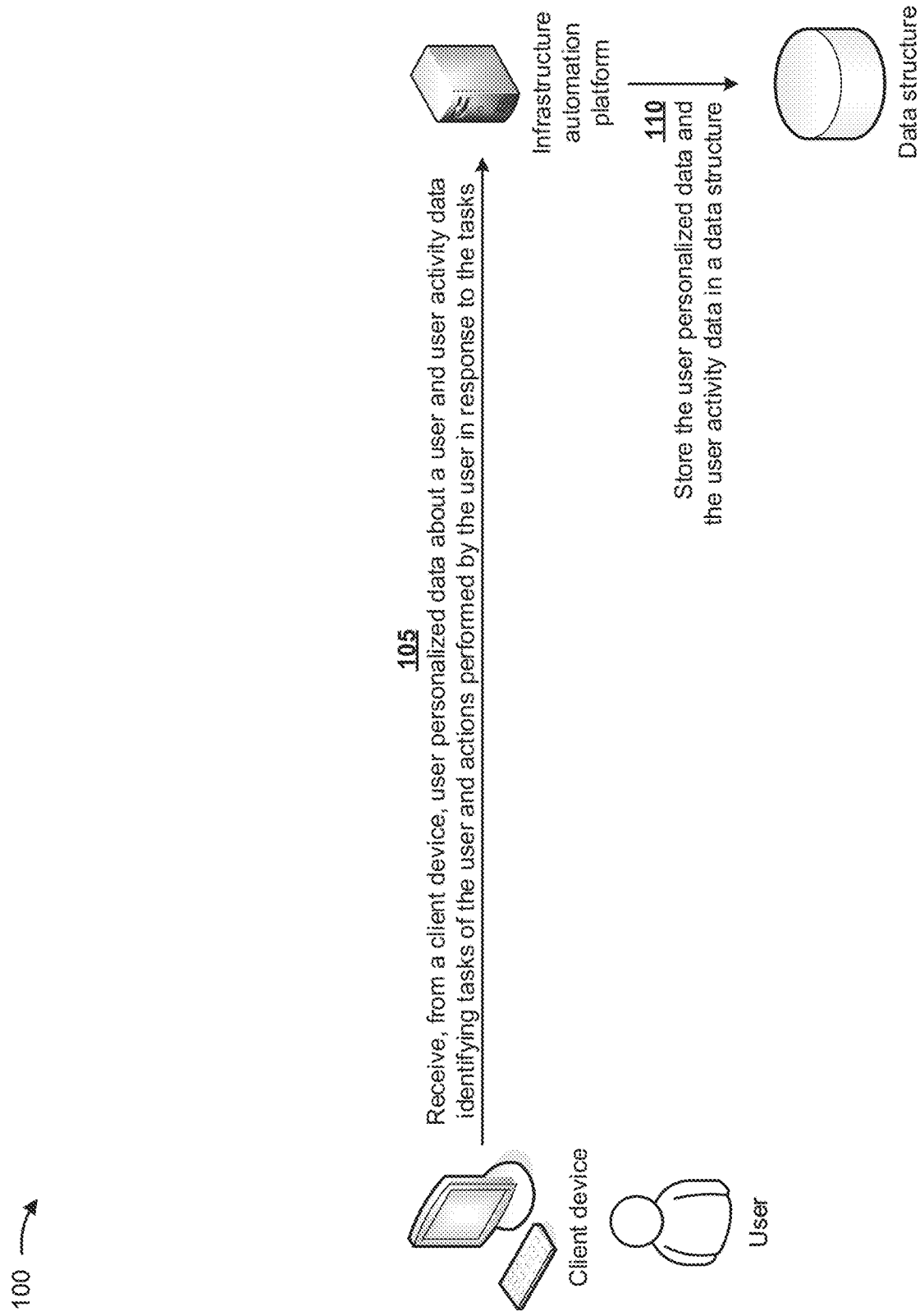
FIGS. 1A-1O are diagrams of one or more example implementations described herein.

The following detailed description of example implementations refers to the accompanying drawings. The same reference numbers in different drawings may identify the same or similar elements.

Currently, some entities deploy software developers, network administrators, network technicians, and/or the like to perform actions in response to tasks associated with systems, networks, network devices, software, and/or the like utilized by the entities. Many of these tasks are repetitive, mundane, and require excessive manpower to perform the actions. Thus, current techniques for performing actions in response to tasks may waste computing resources (e.g., processing resources, memory resources, communication resources, and/or the like), networking resources, human resources, and/or the like associated with incorrectly handling tasks, performing incorrect actions in response to tasks, poorly performing actions, and/or like.

Some implementations described herein provide an infrastructure automation platform that utilizes natural language processing and machine learning to assist in performing actions in response to tasks. For example, the infrastructure automation platform may receive, from a client device associated with a user, user personalized data about the user, user commands, and user activity data identifying tasks of the user and actions performed by the user in response to the tasks, and may perform natural language processing on the user personalized data, the user commands, and the user activity data to generate processed textual data identifying the user personalized data, the tasks, and the actions. The infrastructure automation platform may train one or more machine learning models based on the processed textual data (e.g., from either directly provided textual input or via another system that generates textual data from voice inputs) to generate one or more trained machine learning models that identify particular actions based on particular tasks, and may receive, from the client device, a command identifying a particular task to be performed. The infrastructure automation platform may process the command and the user activity data, with the one or more trained machine learning models, to determine whether a particular action in the user activity data correlates with the particular task. The infrastructure automation platform may perform one or more actions based on the particular action and when the particular action in the user activity data correlates with the particular task.

In this way, the infrastructure automation platform utilizes natural language processing and machine learning to assist in performing actions in response to tasks. The infrastructure automation platform may learn from user tasks and actions, without having to be explicitly programmed by the users. The infrastructure automation platform may complete a variety of tasks for the users (e.g., based on the user tasks and actions), may interact with a wide range of services and/or systems, may respond to user voice commands with proper authentication and security, and/or the like. This, in turn, conserves computing resources, networking resources, and/or the like that would otherwise be wasted in incorrectly handling tasks, performing incorrect actions in response to tasks, poorly performing actions, and/or like.

FIGS. 1A-1O are diagrams of one or more example implementations 100 described herein. As shown in FIG. 1A, one or more client devices may be associated with one or more users and an infrastructure automation platform. The client devices may include mobile devices, computers, and/or the like associated with employees of an entity (e.g., a business, a financial institution, a government agency, and/or the like) that utilizes one or more applications and/or one or more systems. The infrastructure automation platform may include a platform that utilizes natural language processing and machine learning to assist in performing actions in response to tasks, as described herein.

As further shown in FIG. 1A, and by reference number 105, the infrastructure automation platform may receive, from a client device and in near-real time, user personalized data about a user and user activity data identifying tasks of the user and actions performed by the user in response to the tasks. In some implementations, the infrastructure automation platform may periodically receive the user personalized data and the user activity data, may continuously receive the user personalized data and the user activity data, may receive the user personalized data and the user activity data based on a request, and/or the like.

In some implementations, the user personalized data may include data identifying inbound emails associated with the user, outbound emails associated with the user, calendar entries associated with the user, browser history associated with the user, systems associated with the user, software associated with the user, voice commands associated with a voice of the user, images associated with a user-specific trained object (e.g., a face of the user), reasons for which the user communicates with other users, frequent contacts of the user, an organizational hierarchy associated with the user, and/or the like. In some implementations, the user activity data may include data identifying tasks of the user (e.g., new emails, network issues, machine issues, software issues, meetings, research topics, and/or the like) and actions performed by the user (e.g., read and respond to new emails, address network issues, service machine issues, test software issues, schedule meetings, browse the Internet for research topics, and/or the like) in response to the tasks.

In some implementations, there may be hundreds, thousands, and/or the like, of client devices that produce thousands, millions, billions, and/or the like, of data points provided in the user personalized data and the user activity data. In this way, the infrastructure automation platform may handle thousands, millions, billions, and/or the like, of data points within a period of time (e.g., daily, weekly, monthly), and thus may provide "big data" capability.

As further shown in FIG. 1A, and by reference number 110, the infrastructure automation platform may store the user personalized data and the user activity data (e.g., with permission from the user) in a data structure (e.g., a database, a table, a list, and/or the like) associated with the infrastructure automation platform.

In some implementations, the client device may include an application (e.g., a mobile application, a web application, and/or the like) via which the infrastructure automation platform may assist the user. The application may collect the user personalized data and the user activity data (e.g. login activities, commands issued, success rate, user preferences, and/or the like) from various sources (e.g. calendar information, browser history, emails, transactions, user interactions, and/or the like), and may provide the user personalized data and the user activity data in a user action log.

Figure 1B:
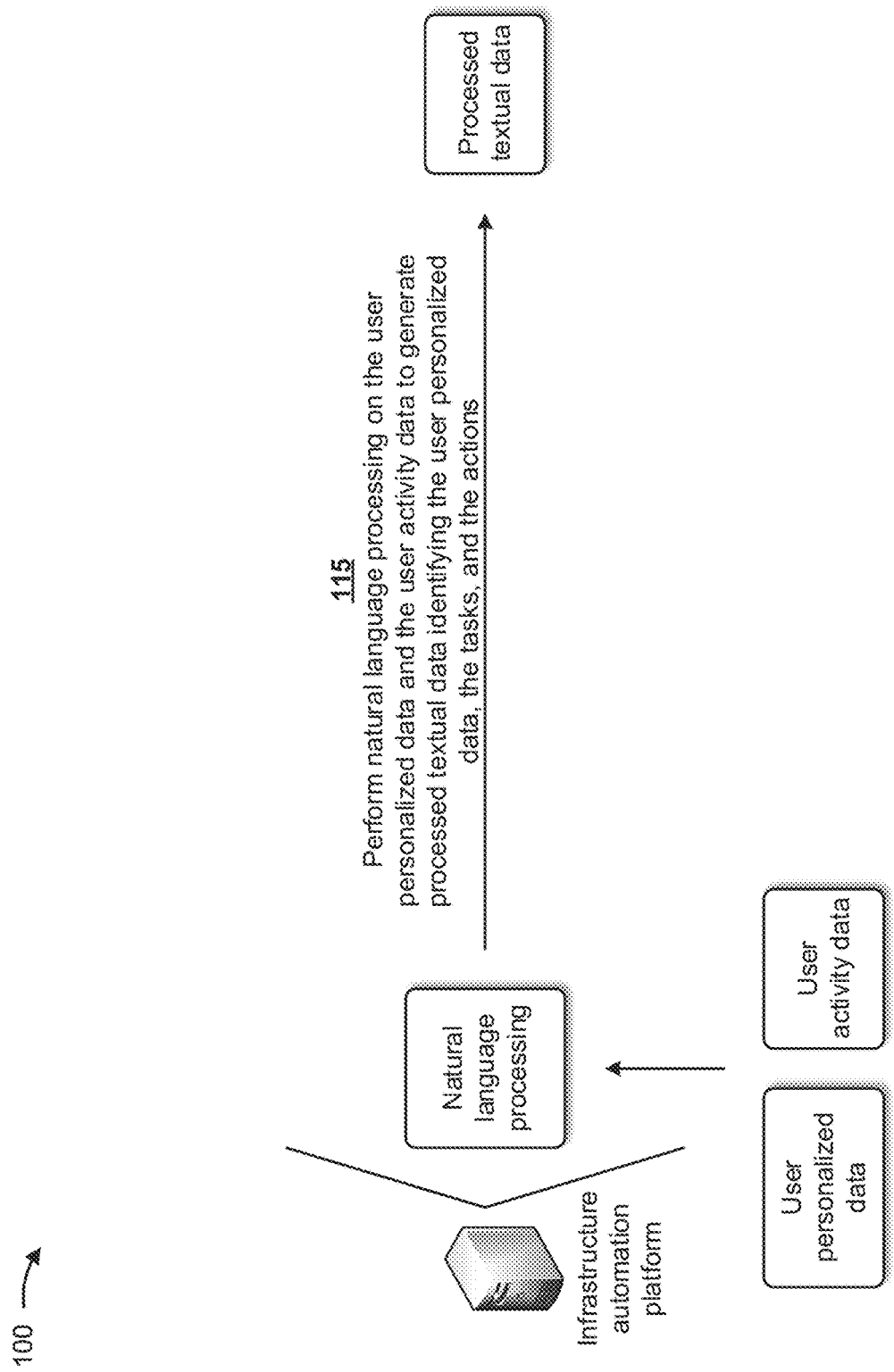

As shown in FIG. 1B, and by reference number 115, the infrastructure automation platform may perform natural language processing on the user personalized data and the user activity data to generate processed textual data identifying the user personalized data, the tasks, and the actions. In one example, when generating the processed textual data, the infrastructure automation platform may convert the user activity data, provided as a text command or as text converted from a voice input by any third-party application associated with the user. In some implementation, the infrastructure automation platform may take user activity data, such as commands issued in the form of text. In some implementations, when performing the natural language processing, the infrastructure automation platform may employ natural language understanding (NLU) and natural language generation (NLG) to understand or create a human natural language representation that can be processed by a computer and/or to generate a description from a structured data set in natural language tailored to specific rule sets. The infrastructure automation platform may use NLU to recognize user activity, intent from the textual command, text converted from a voice command by any third-party application associated with the user, and/or the like. The infrastructure automation platform may process the transcripts to remove lexical, syntactical, and referential ambiguity, to extract meaningful information from the transcripts, and to identify a user intent. Once user intent is identified, the infrastructure automation platform may validate input parameters, if required, and may execute appropriate actions and create a response using NLG.

In some implementations, the processed textual data may include the user personalized data and the user activity data in a format that may be utilized by machine learning models, as described below in connection with FIG. 1C. In some implementations, the infrastructure automation platform may remove stop words from the user personalized data and the user activity data, may pre-process the user personalized data and the user activity data, may apply lemmatization to the user personalized data and the user activity data, may create a set of resultant keywords for each sentence in the user personalized data and the user activity data, and/or the like in order to generate the processed textual data. In some implementations, when performing the natural language processing on the user personalized data and the user activity data, the infrastructure automation platform may remove punctuations from the user personalized data and the user activity data, may tokenize words in the user personalized data and the user activity data to enable analysis of the words, may remove sentences with less than a predetermined quantity of words from the user personalized data and the user activity data, may determine most frequent keywords utilized in the user personalized data and the user activity data, and/or the like. When performing the natural language processing on the user personalized data and the user activity data, the infrastructure automation platform may convert the user personalized data and the user activity data into machine-readable text, may split the machine-readable text into an array of words, may split the array of words into sequences of contiguous words, may calculate word scores for the sequences of contiguous words, and/or the like.

In some implementations, the infrastructure automation platform may perform at least a portion of the natural language processing using a machine learning model. In this case, the infrastructure automation platform may train the machine learning model with historical data (e.g., historical user personalized data and historical user activity data) to enable the machine learning model to generate the processed textual data. For example, the infrastructure automation platform may train the machine learning model in a manner similar to the manner described below in connection with FIG. 4. In some implementations, rather than training the machine learning model, the infrastructure automation platform may obtain the machine learning model from another system or device that trained the machine learning model. In this case, the infrastructure automation platform may provide the other system or device with historical data for use in training the machine learning model, and may provide the other system or device with updated historical data to retrain the machine learning model in order to update the machine learning model.

Figure 1C:
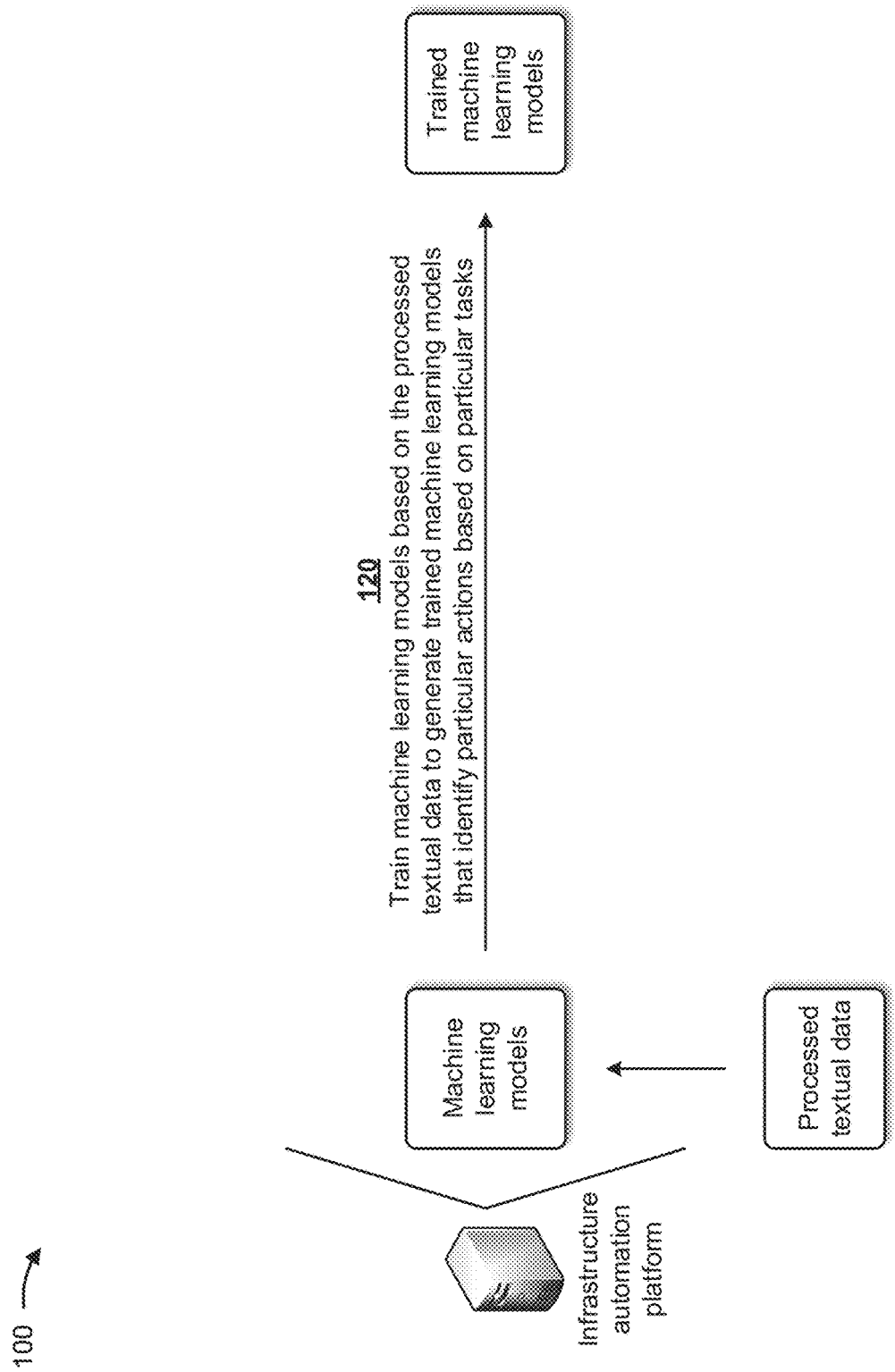

As shown in FIG. 1C, and by reference number 120, the infrastructure automation platform may train machine learning models, based on the processed textual data, to generate trained machine learning models that identify particular actions based on particular tasks. The machine learning models may include a clustering model, a decision tree model, a k-means model, a natural language processing model, a natural language generation model, and/or the like. In some implementations, the infrastructure automation platform may train the machine learning models to identify particular actions based on particular tasks, the user personalized data, the user activity data, and/or the like. For example, the infrastructure automation platform may train one or more of the machine learning models to identify the intent of a user command. In some implementations, the infrastructure automation platform may train the machine learning models with historical data (e.g., historical processed textual data) to generate the trained machine learning models. For example, the infrastructure automation platform may train the machine learning models in a manner similar to the manner described below in connection with FIG. 4. In some implementations, rather than training the machine learning models, the infrastructure automation platform may obtain the machine learning models from another system or device that trained the machine learning model. In this case, the infrastructure automation platform may provide the other system or device with historical data for use in training the machine learning models, and may provide the other system or device with updated historical data to retrain the machine learning models in order to update the machine learning models.

Figure 1D:
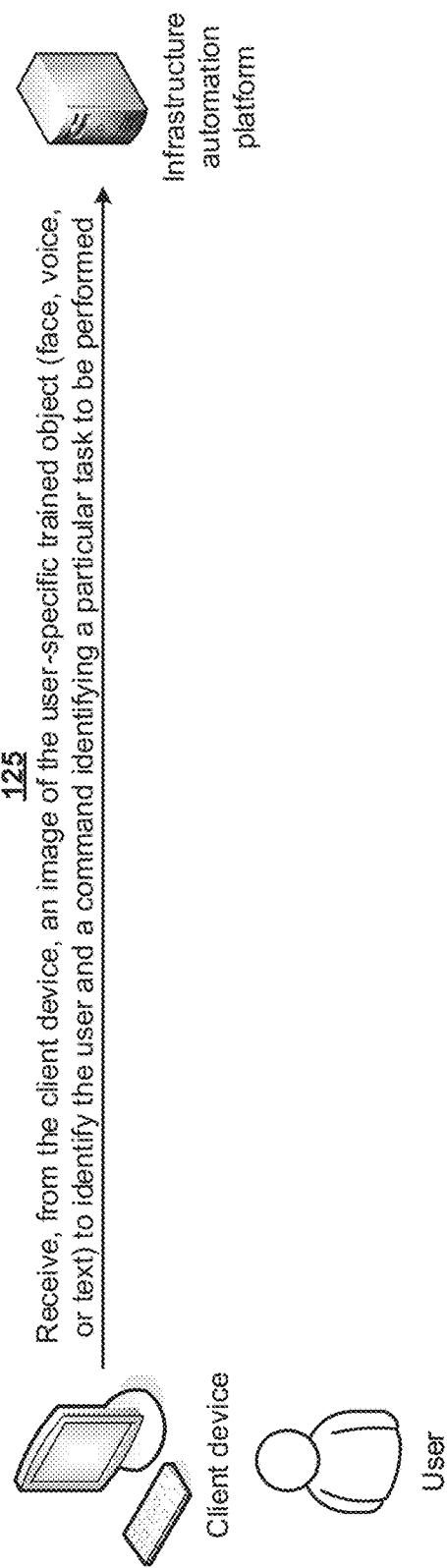

As shown in FIG. 1D, and by reference number 125, the infrastructure automation platform may receive, from the client device, an image of the user-specific trained object (face, voice, or text) to identify the user and a command identifying a particular task to be performed. For example, the infrastructure automation platform may receive, from the client device, a textual command, a converted transcript of a voice command, an image of a user provided object (e.g., a user's face), identifying a particular task to be performed. In some implementations, the infrastructure automation platform may receive the user provided object prior to or with receipt of a transcript of the voice command. In some implementations, the image of the user provided object, may include a face of the user, which the infrastructure automation platform may utilize to authenticate the user, based on hardware resources of the client device associated with the user or based on a requirement for such authentication associated with particular task. In some implementations, the voice command may be in the form of a natural language question, a query, and/or the like, and may be received via a textual input, a chat interface, a voice interface, and/or the like. For example, the user may utilize the client device to speak the voice command, and the client device may provide the spoken voice command to the infrastructure automation platform with the converted transcript of the voice command.

In some implementations, the client device may include an application (e.g., a mobile application, a web application, and/or the like) via which the infrastructure automation platform may assist the user. The application may provide a user interface that receives voice or text instruction as an input from the user. In the case of voice instruction, the application may receive a voice input and the application and/or the infrastructure automation platform may generate a text output. In this case, the application and/or the infrastructure automation platform may perform voice processing, may utilize a third-party voice assistant to perform the voice processing, and/or the like. Additionally, the user interface may receive a visual input (e.g., via a camera of the client device) to capture the image of the user provided object, and the application and/or the infrastructure automation platform may perform image recognition to identify the user, the user activity, or information associated with the user provided object. In some implementations, the application may cause the user interface to be displayed based on a wake message, may receive the voice command (e.g., from the client device that transcribed speech into text), may stream the textual command through application programming interfaces (APIs) to the infrastructure automation platform, and/or the like.

Figure 1E:
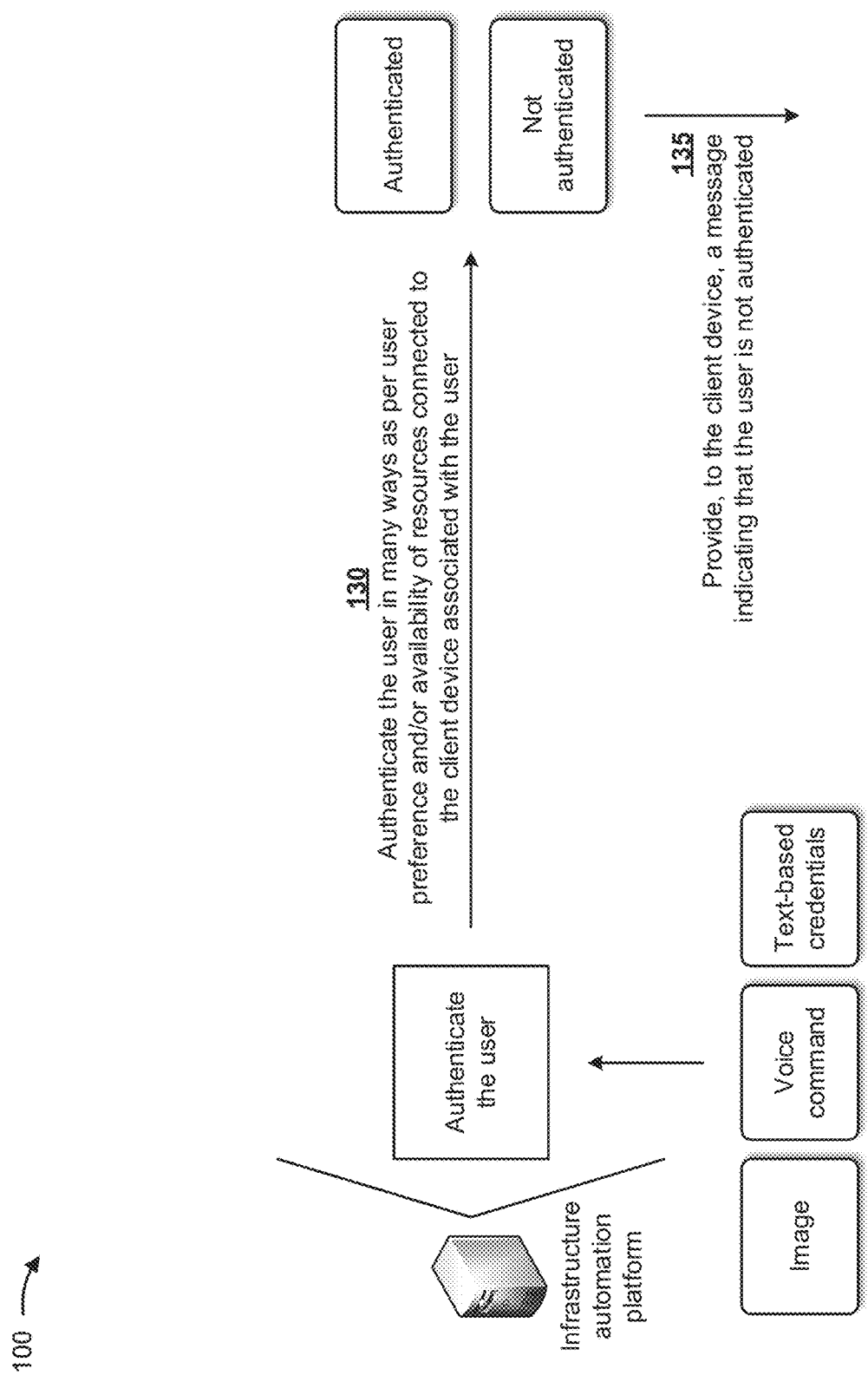

As shown in FIG. 1E, and by reference number 130, the infrastructure automation platform may authenticate the user in many ways as per user preference and/or availability of resources connected to the client device associated with the user. For example, the infrastructure automation platform may perform facial recognition of the image of the user's face, may perform voice recognition of the voice command, and/or may validate textual credentials, and may determine whether the user is authenticated based on performing the facial recognition of the image of the user's face, the voice recognition of the voice command, and/or the validation of the textual credentials. In some implementations, authentication of the user may be performed based on a user selected technique, resources available to the client device of the user, and/or the like. In some implementations, the infrastructure automation platform may determine that the user is authenticated to utilize the infrastructure automation platform based on the facial recognition and/or the voice recognition (e.g., the user's face or voice matches a face or voice stored by the application platform). Alternatively, the infrastructure automation platform may determine that the user is not authenticated to utilize the infrastructure automation platform based on the facial recognition, the voice recognition, and/or the validation of the text credentials (e.g., the user's face or voice fails to match a face or voice stored by the application platform or invalid credentials were provided).

As further shown in FIG. 1E, and by reference number 135, the infrastructure automation platform may provide, to the client device, a message indicating that the user is not authenticated to utilize the infrastructure automation platform when the infrastructure automation platform determines that the user is not authenticated based on the facial recognition of the image of the user's face, the voice recognition of the voice command, and/or the validation of the text credentials.

Figure 1F:
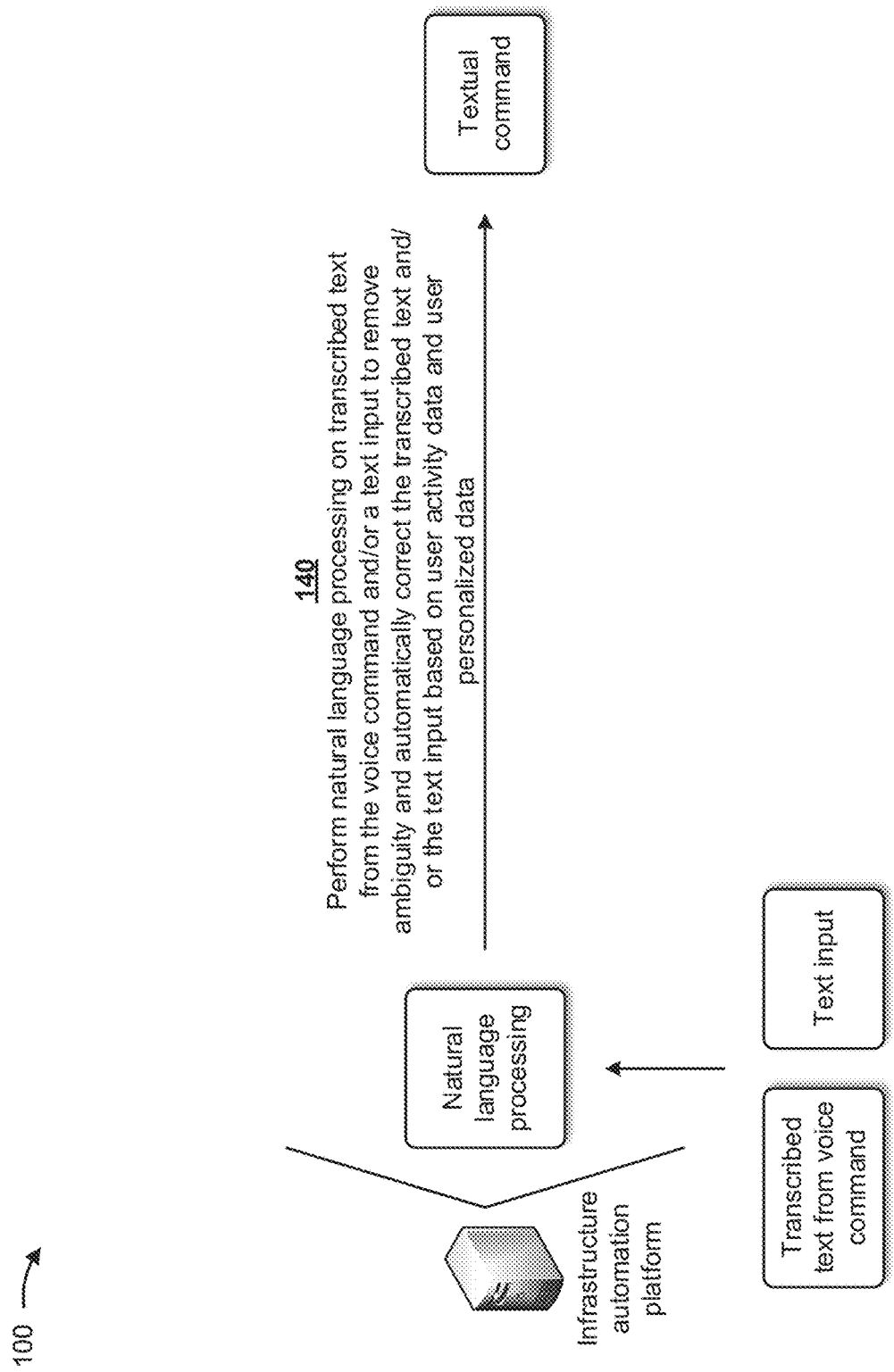

As shown in FIG. 1F, and by reference number 140, when the user is authenticated to utilize the infrastructure automation platform, the infrastructure automation platform may perform natural language processing on transcribed text from the voice command and/or a text input to remove ambiguity and automatically correct the transcribed text and/or the text input based on user activity data and/or user personalized data. For example, the infrastructure automation platform may wait for an input (e.g., from the client device) that includes the textual command and/or a converted transcript of a voice command issued by the user, and may perform natural language processing on the textual command to identify user intent (e.g., a user intended task). Based the user activity data and a description of the user intended task, the infrastructure automation platform may generate text that may be provided to the user via the client device. In some implementations, the infrastructure automation platform may perform natural language processing on the textual command and/or the converted transcript of a voice command issued by the user in a manner similar to the natural language processing described above in connection with FIG. 1C. For example, when performing the natural language processing on the textual command and/or the converted transcript of a voice command issued by the user, the infrastructure automation platform may remove punctuations from the text input, may tokenize words in the text input to enable analysis of the words, may determine most frequent keywords utilized in the textual command and/or the converted transcript of a voice command issued by the user, may convert the text input into machine-readable text, may split the machine-readable text into an array of words, may split the array of words into sequences of contiguous words, may calculate word scores for the sequences of contiguous words, and/or the like to identify the user intent from the text command.

Figure 1G:
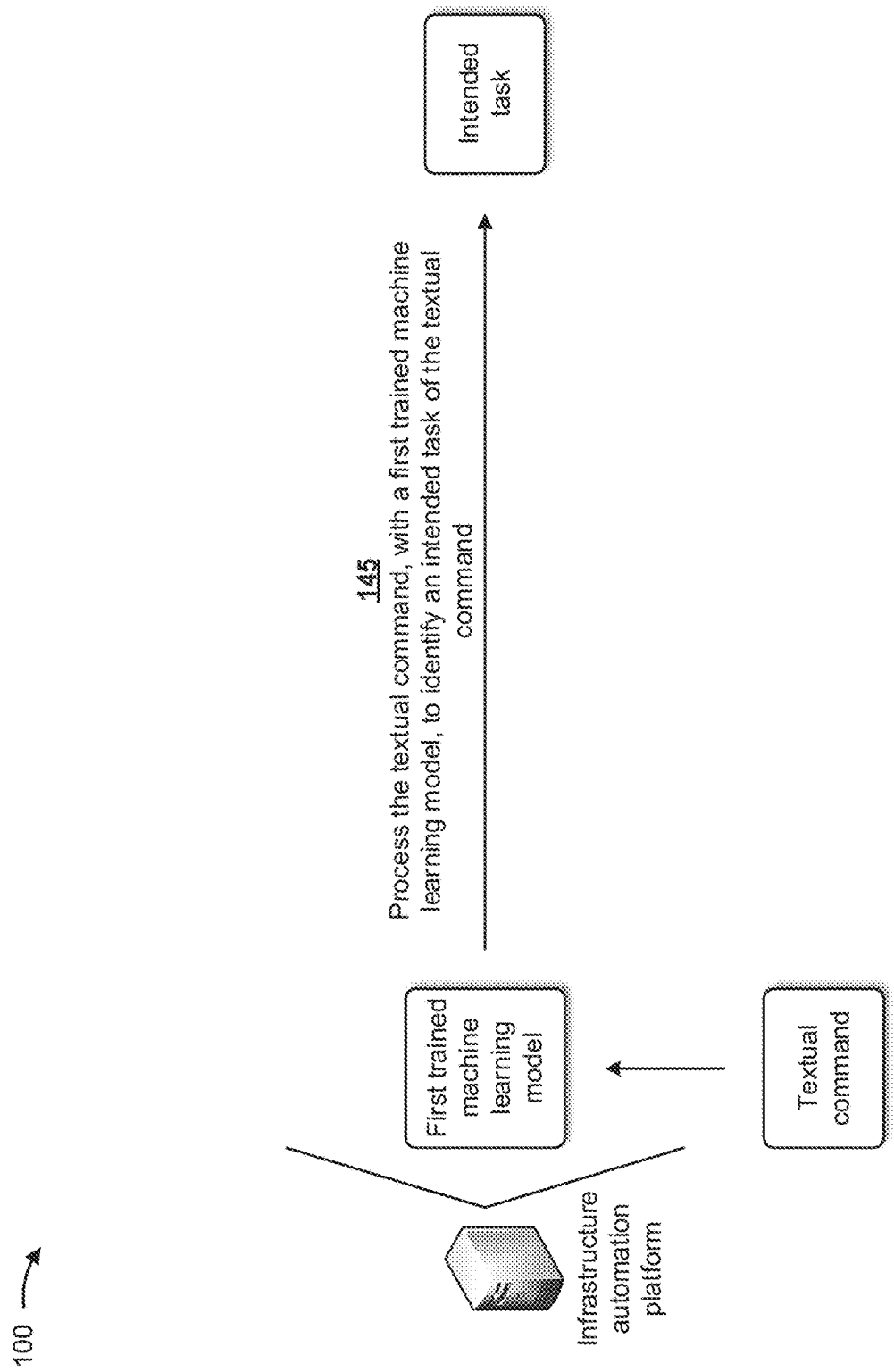

As shown in FIG. 1G, and by reference number 145, the infrastructure automation platform may process the textual command, with a first trained machine learning model of the trained machine learning models, to identify (e.g., predict) an intended task of the textual command. For example, the infrastructure automation platform may apply the first trained machine learning model to a new observation in a manner similar to the manner described below in connection with FIG. 5. In some implementations, the first machine learning model may employ self-learning (e.g., reinforcement learning), allowing the first machine learning model to make decisions based on prior experience. In some implementations, the first trained machine learning model may have been trained to identify an intent of the textual command, and may ascertain a purpose of the textual command based on specific words used in free text of the textual command.

In some implementations, the intended task of the textual command may include new emails received by the user, network issues to be handled by the user, machine issues to be serviced by the user, software issues to be managed by the user, meetings to be attended by the user, research topics to be researched by the user, and/or the like. The first machine learning model may analyze the textual command to identify the intended task from the one of the aforementioned tasks.

Figure 1H:
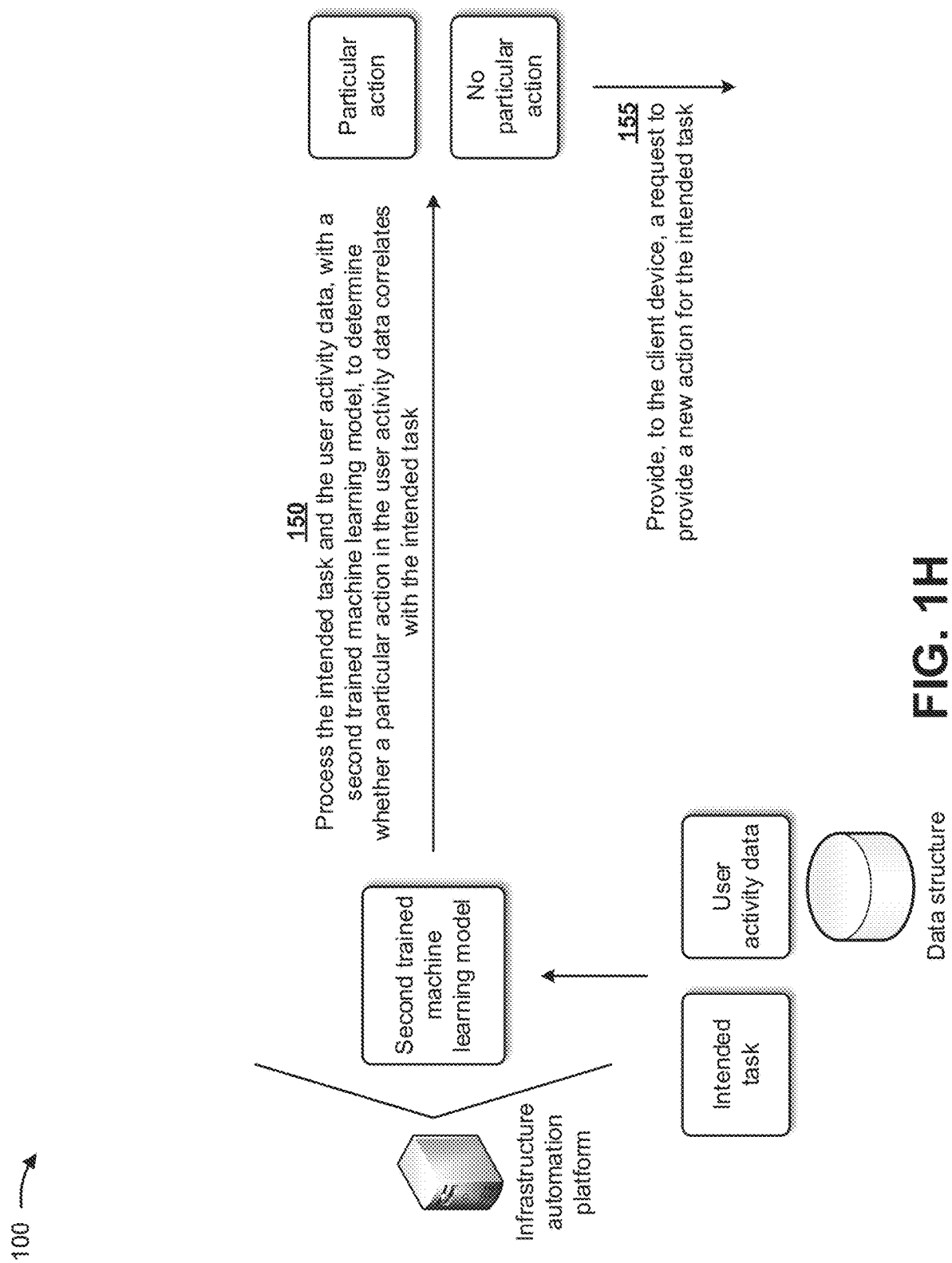

As shown in FIG. 1H, and by reference number 150, the infrastructure automation platform may process the intended task and the user activity data, with a second trained machine learning model of the trained machine learning models, to determine (e.g., predict) whether a particular action in the user activity data correlates with the intended task. For example, the infrastructure automation platform may apply the second trained machine learning model to a new observation in a manner similar to the manner described below in connection with FIG. 5. In some implementations, the infrastructure automation platform may manage a repository (e.g., the data structure that includes the user personalized data and the user activity data) of tasks and associated actions that define a set of capabilities of the infrastructure automation platform (e.g., to perform actions associated with tasks). The set of capabilities may be implemented by the infrastructure automation platform via scripts, dynamic link library files (DLLs), APIs, executable extensions, and/or the like, and may be utilized to create dynamic workflows for the user.

In some implementations, the infrastructure automation platform (e.g., via the second machine learning model) may determine that a particular action in the user activity data correlates with the intended task. In some implementations, the particular action may include reading and responding to a new email, addressing a network issue, servicing a machine issue, testing a software issue, scheduling a meeting, browsing the Internet for a research topic, and/or the like. Alternatively, the infrastructure automation platform may determine (e.g., via the second machine learning model) that no particular action in the user activity data correlates with the intended task.

As further shown in FIG. 1H, and as shown by reference number 155, when no particular action in the user activity data correlates with the intended task, the infrastructure automation platform may provide, to the client device, a request to provide a new action for the intended task. For example, the infrastructure automation platform may provide, to the client device, a request to provide a new action that satisfies the intended task based on determining that no particular action in the user activity data correlates with the intended task. In this case, the infrastructure automation platform may receive, from the client device, information indicating the new action for satisfying the intended task, and may retrain the second trained machine learning model with the information indicating the new action.

Figure 1I:
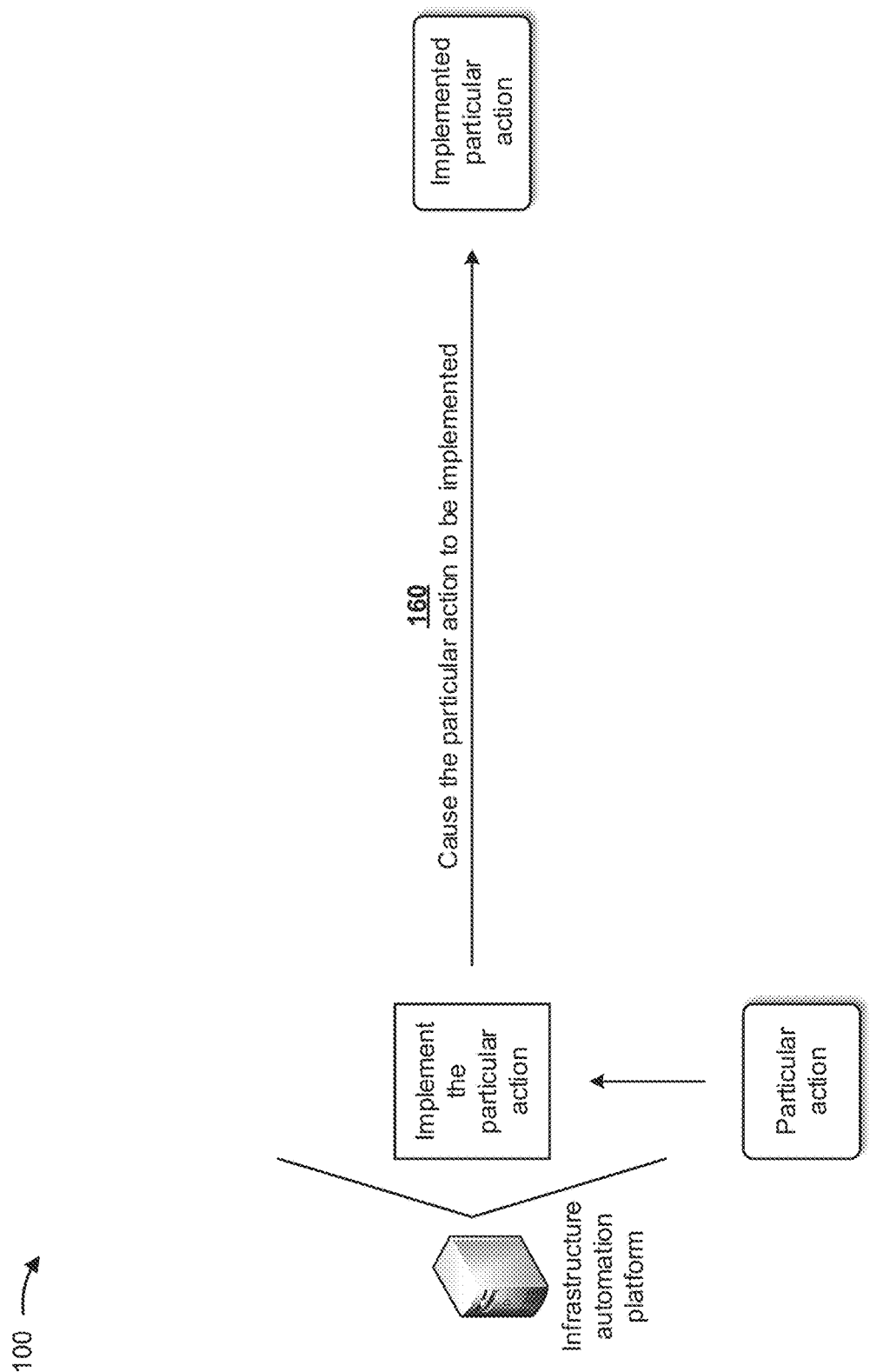

As shown in FIG. 1I, and by reference number 160, the infrastructure automation platform may cause the particular action to be implemented. In some implementations, the infrastructure automation platform may automatically read and respond to a new email for the user, may automatically address a network issue, may automatically service a machine issue, may automatically perform a test for a software issue, may automatically schedule a meeting for the user, may automatically browse the Internet for a research topic and provide search results to the user, and/or the like. In some implementations, the infrastructure automation platform may provide, to the client device, instructions for causing the particular action to be implemented, and the client device may cause the particular action to be implemented based on the instructions. For example, the infrastructure automation platform may read a new email to the user and may generate a proposed response to the new email. The infrastructure automation platform may provide the proposed response to the client device, and the client device may send the response (e.g., after review by the user) to one or more intended recipients.

As shown in FIG. 1J, and by reference number 165, the infrastructure automation platform may process the particular action, with an NLG model, to convert the particular action into a natural language response. For example, the infrastructure automation platform may apply the NLG model to a new observation in a manner similar to the manner described below in connection with FIG. 5. In some implementations, the NLG model may perform NLG, which enables machines to simulate human to human conversations. NLG uses numerical information and mathematical formulas to extract patterns from any given data and to convert the patterns into natural language that is easy for humans to understand and comprehend. In this way, the infrastructure automation platform may utilize NLG to provide contextual answers (e.g., regarding particular actions) to questions.

In some implementations, the NLG model may generate natural language text for reports, emails, conversational messages, and/or the like. The NLG model may apply, to the particular action, utterance planning (e.g., based on discourse content), syntactic realization (e.g., based on lexicons and grammar), morphological reasoning (e.g., based on morphological rules), speech synthesis (e.g., based on a pronunciation model), and/or the like. In some implementations, the natural language response may include voice instructions about the particular action to be taken by the user. The voice instructions may enable the user to utilize the client device to cause the particular action to be implemented. For example, the voice instructions may include instructions indicating that a network device is not performing correctly and that the user should test the network device.

Figure 1K:
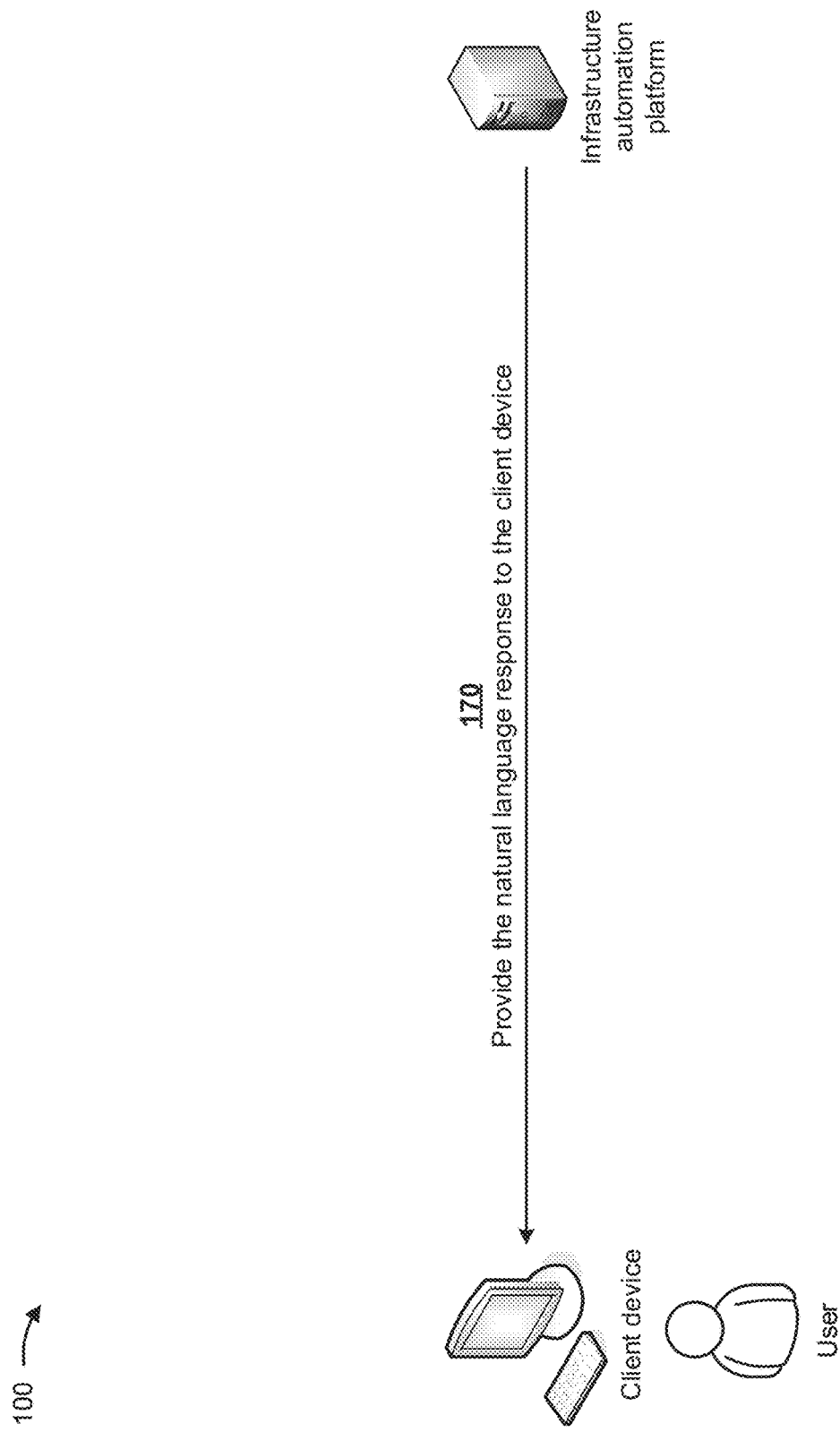

As shown in FIG. 1K, and by reference number 170, the infrastructure automation platform may provide the natural language response to the client device. In some implementations, when the natural language response includes voice instructions, the client device may play the voice instructions to the user via a speaker of the client device. In some implementations, the client device may save the natural language response for later use. In some implementations, the infrastructure automation platform may utilize a third party voice application to convert the particular action into the natural language response, to provide the natural language response to the client device, to play the natural language response, to save the natural language response, and/or the like.

In some implementations, the user may utilize the client device and the natural language response to cause the particular action to be implemented. For example, the infrastructure automation platform may suggest, via the natural language response, that the user dispatch a robot or an unmanned vehicle to service a malfunctioning machine. The user may utilize the client device to dispatch the robot or the unmanned vehicle to service the malfunctioning machine. Alternatively, the infrastructure automation platform may automatically dispatch the robot or the unmanned vehicle with permission of the user.

Figure 1L:
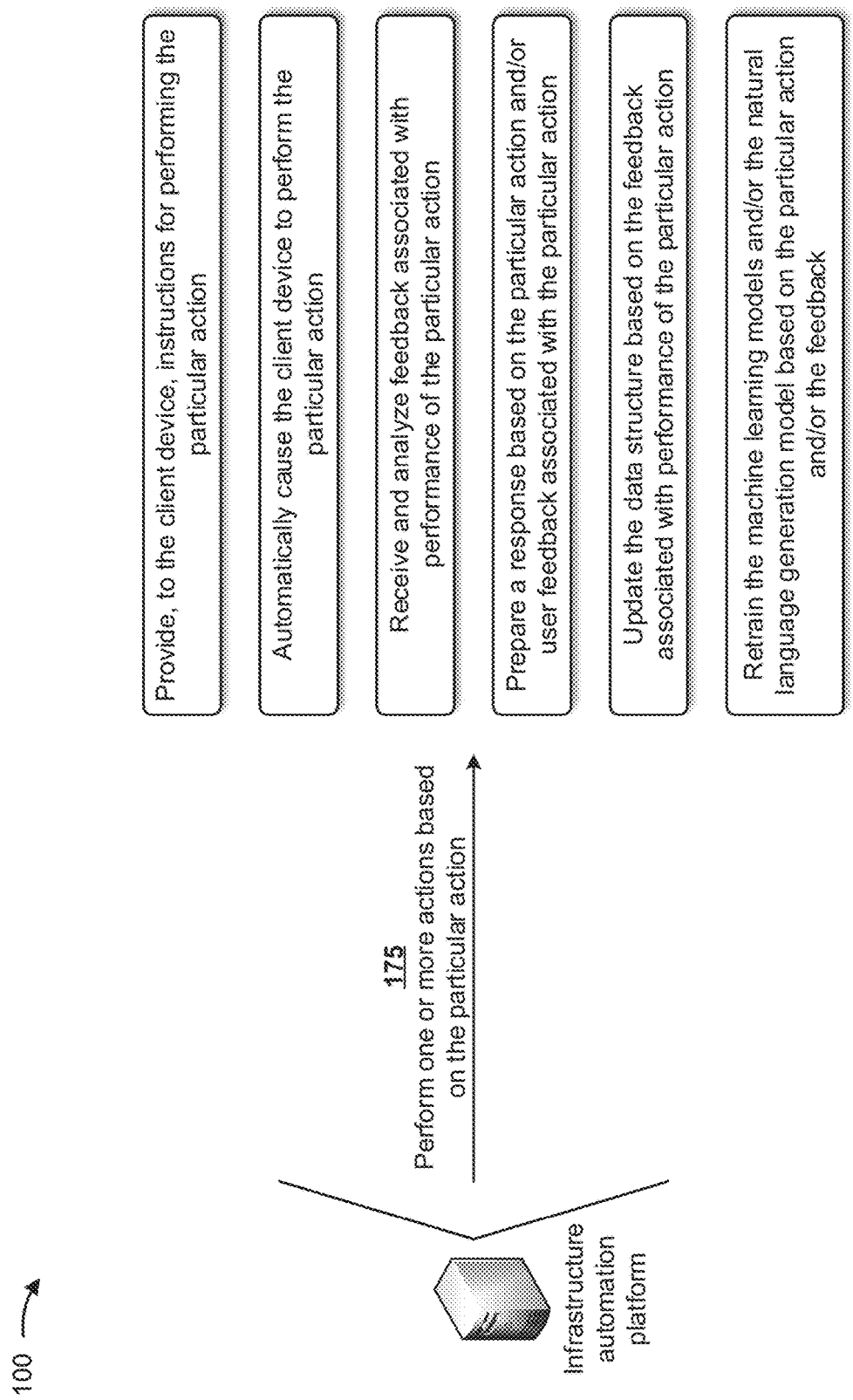

As shown in FIG. 1L, and by reference number 175, the infrastructure automation platform may perform one or more actions based on the particular action. In some implementations, the one or more actions may include the infrastructure automation platform providing, to the client device, instructions for performing the particular action. For example, the infrastructure automation platform may provide the instructions to the client device, and the client device may display the instructions to the user. In this way, the infrastructure automation platform may enable the user to receive instructions for performing the particular action, thereby conserving computing resources (e.g., processing resources, memory resources, communication resources, and/or the like), networking resources, and/or the like that would otherwise be wasted by the user in determining the particular action.

In some implementations, the one or more actions may include the infrastructure automation platform automatically causing the client device to perform the particular action. For example, the infrastructure automation platform may automatically determine that a file system needs to be resized and may automatically resize the file system based on receiving a voice command indicating that the file system is not performing correctly. In this way, the infrastructure automation platform may free the user from determining the particular action and performing the particular action, which may enable the user to address other tasks, thereby conserving computing resources, networking resources, and/or the like that would otherwise be wasted in determining and performing the particular action.

In some implementations, the one or more actions may include the infrastructure automation platform receiving and analyzing feedback associated with performance of the particular action. For example, the infrastructure automation platform may receive feedback from the user via the client device and may analyze the feedback to determine whether the action was performed successfully, whether improvements are needed in performing the action, whether a different action should have been performed, and/or the like. In this way, the infrastructure automation platform may continually monitor performance and improve processes as needed.

In some implementations, the one or more actions may include the infrastructure automation platform preparing a response based on the particular action and/or user feedback associated with the particular action. For example, if the particular action requires correcting hardware in a network, the infrastructure automation platform may automatically dispatch a robot, an unmanned vehicle, and/or a technician or execute the script or program to perform the correction to the hardware. In this way, the infrastructure automation platform may automatically cause performance of the performance action, thereby conserving resources that would otherwise be wasted in arranging for the particular action to be performed, to procure personnel and/or other resources to perform the particular action, to schedule the particular action to be performed, and/or the like.

In some implementations, the one or more actions may include the infrastructure automation platform updating the data structure based on the feedback associated with performance of the particular action. For example, the infrastructure automation platform may add, remove, increase, or decrease a correlation between a task and one or more actions for performing the task, as provided in the data structure. In this way, the infrastructure automation platform may continually improve an efficiency and an effectiveness of actions recommended by the infrastructure automation platform, thereby conserving computing resources, networking resources, and/or the like that would otherwise be wasted in taking actions that are less efficient or effective.

In some implementations, the one or more actions may include the infrastructure automation platform retraining the machine learning models and/or the NLG model based on the particular action and/or feedback associated with performance of the particular action. In this way, the infrastructure automation platform may improve the accuracy of the machine learning models and/or the NLG model in processing the textual command to identify an intended task of the textual command, processing the intended task and the user activity data to determine whether a particular action in the user activity data correlates with the intended task, and/or the like, which may improve speed and efficiency of the machine learning models and/or the NLG model and conserve computing resources, networking resources, and/or the like.

Figure 1M:
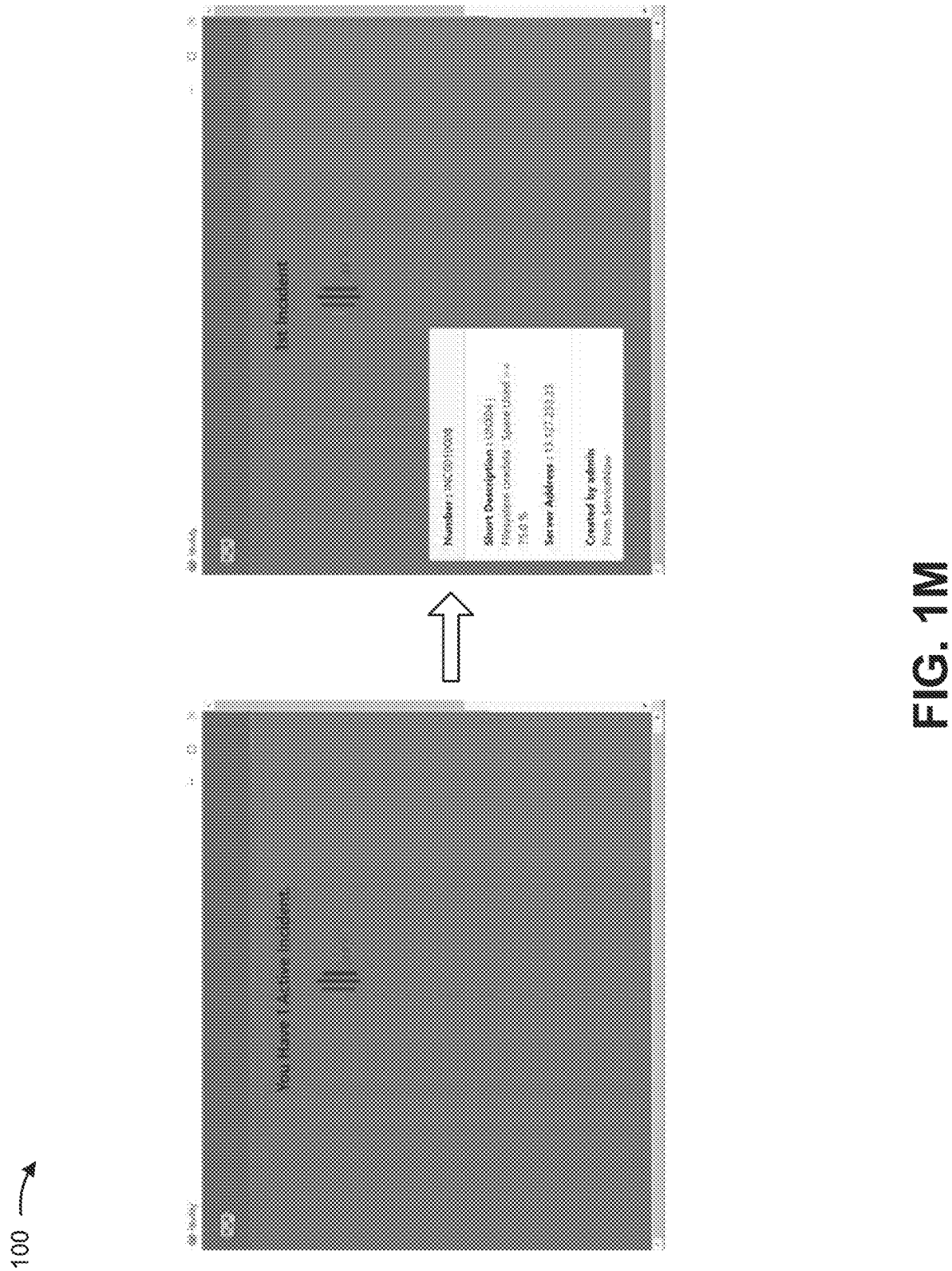
Figure 1N:
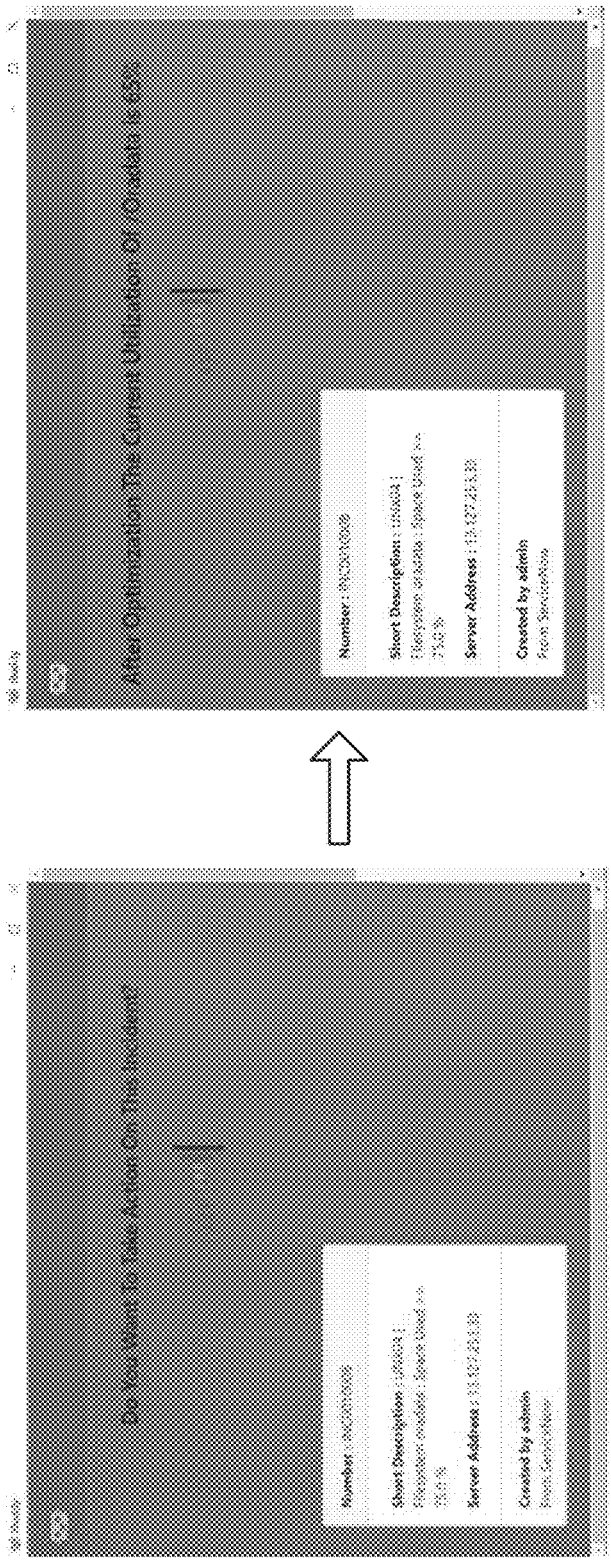
Figure 10:
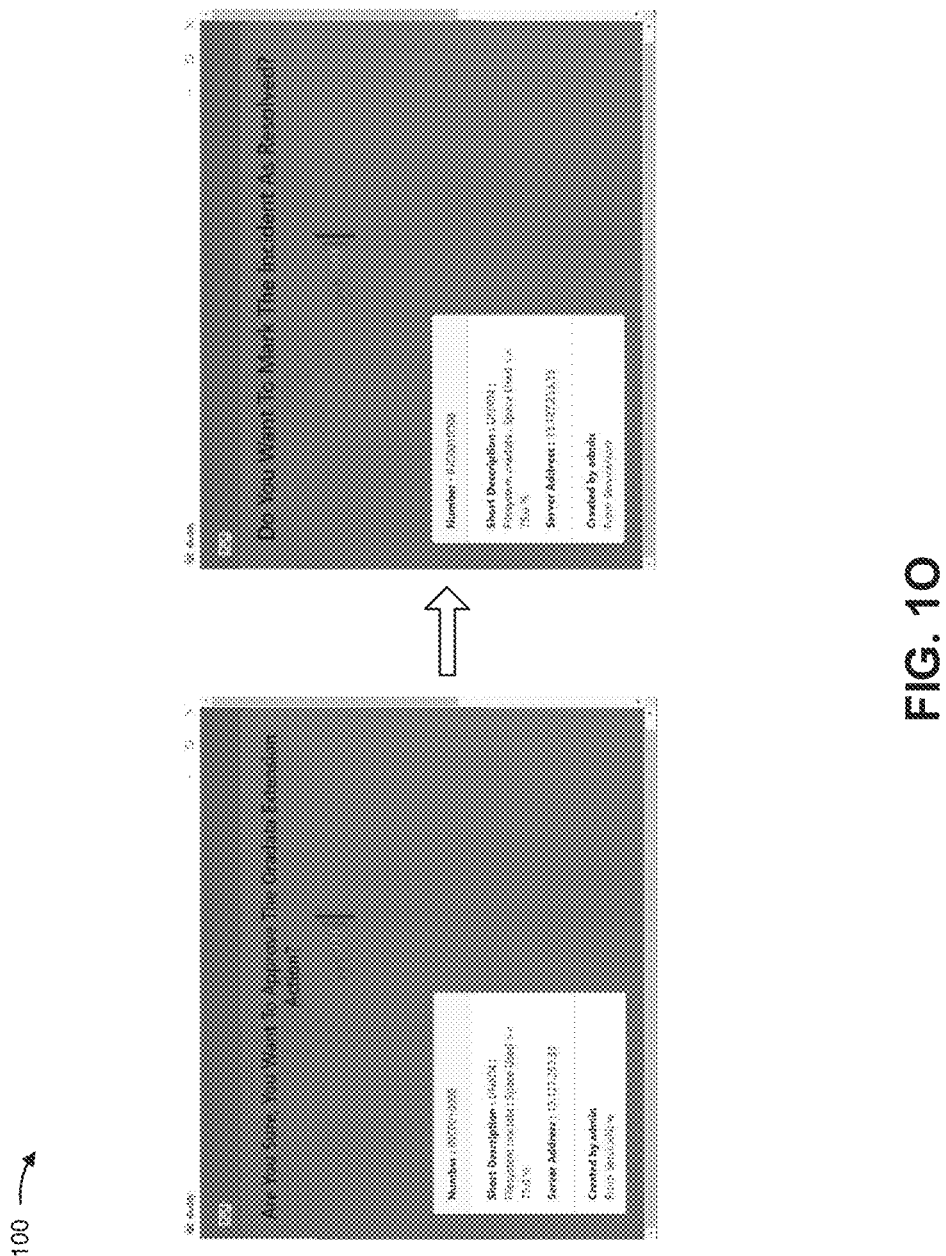

FIGS. 1M-1O provide example interactions between the client device and the infrastructure automation platform via user interfaces provided by the client device and/or the infrastructure automation platform. As shown on a left side of FIG. 1M, the infrastructure automation platform, after authenticating the user via voice recognition and/or facial recognition, may request a command from the user and may display a message (e.g., "How can I help you?") to prompt the user. The user may respond to the prompt by asking the infrastructure automation platform to show all incidents (e.g., relevant to the user), and the infrastructure automation platform may provide a user interface that displays all active incidents that are in a queue associated with the user. As shown on a right side of FIG. 1M, since there is only one active incident for the user, the infrastructure automation platform may provide a user interface that displays a first incident. The first incident may include, for example, an incident number, a short description of the incident, a server address, a source of identification of the incident, and/or the like.

As shown on a left side of FIG. 1N, the infrastructure automation platform may request whether the user wishes to act on the first incident. When the user indicates (e.g., via voice command) that action is to be taken on the first incident, the infrastructure automation platform may determine a relevant action that can resolve the first incident (e.g., optimize a file system). The infrastructure automation platform may wait for user confirmation before performing the relevant action for the first incident. As shown on a right side of FIG. 1N, the infrastructure automation platform may cause the relevant action to be implemented (e.g., may optimize the file system), and may perform additional operations related to the relevant action, such as confirming a current state of the file system. The infrastructure automation platform may cause the client device to prompt the user for any further operations, such as file system housekeeping, optimization, and/or the like.

As shown on a left side of FIG. 1O, the infrastructure automation platform may request that the user confirm performance of additional operations (e.g., may request that the user approve optimization or re-sizing of the file system), and the user may provide the confirmation via the client device. As shown on a right side of FIG. 1O, the infrastructure automation platform may cause the client device to display a message indicating completion of the additional operations, and may request that the user confirm that the first incident has been resolved. Upon user confirmation, the infrastructure automation platform may close the first incident.

In this way, several different stages of the process for performing actions in response to tasks are automated via natural language processing and machine learning, which may remove human subjectivity and waste from the process, and which may improve speed and efficiency of the process and conserve computing resources (e.g., processing resources, memory resources, communication resources, and/or the like), networking resources, and/or the like. Furthermore, implementations described herein use a rigorous, computerized process to perform tasks or roles that were not previously performed or were previously performed using subjective human intuition or input. For example, currently there does not exist a technique that utilizes natural language processing and machine learning to assist in performing actions in response to tasks in the manner described herein. Finally, the process for utilizing natural language processing and machine learning to assist in performing actions in response to tasks conserves computing resources, networking resources, and/or the like that would otherwise be wasted in incorrectly handling tasks, performing incorrect actions in response to tasks, poorly performing actions, and/or like.

As indicated above, FIGS. 1A-1O are provided merely as examples. Other examples may differ from what is described with regard to FIGS. 1A-1O.

Figure 2:
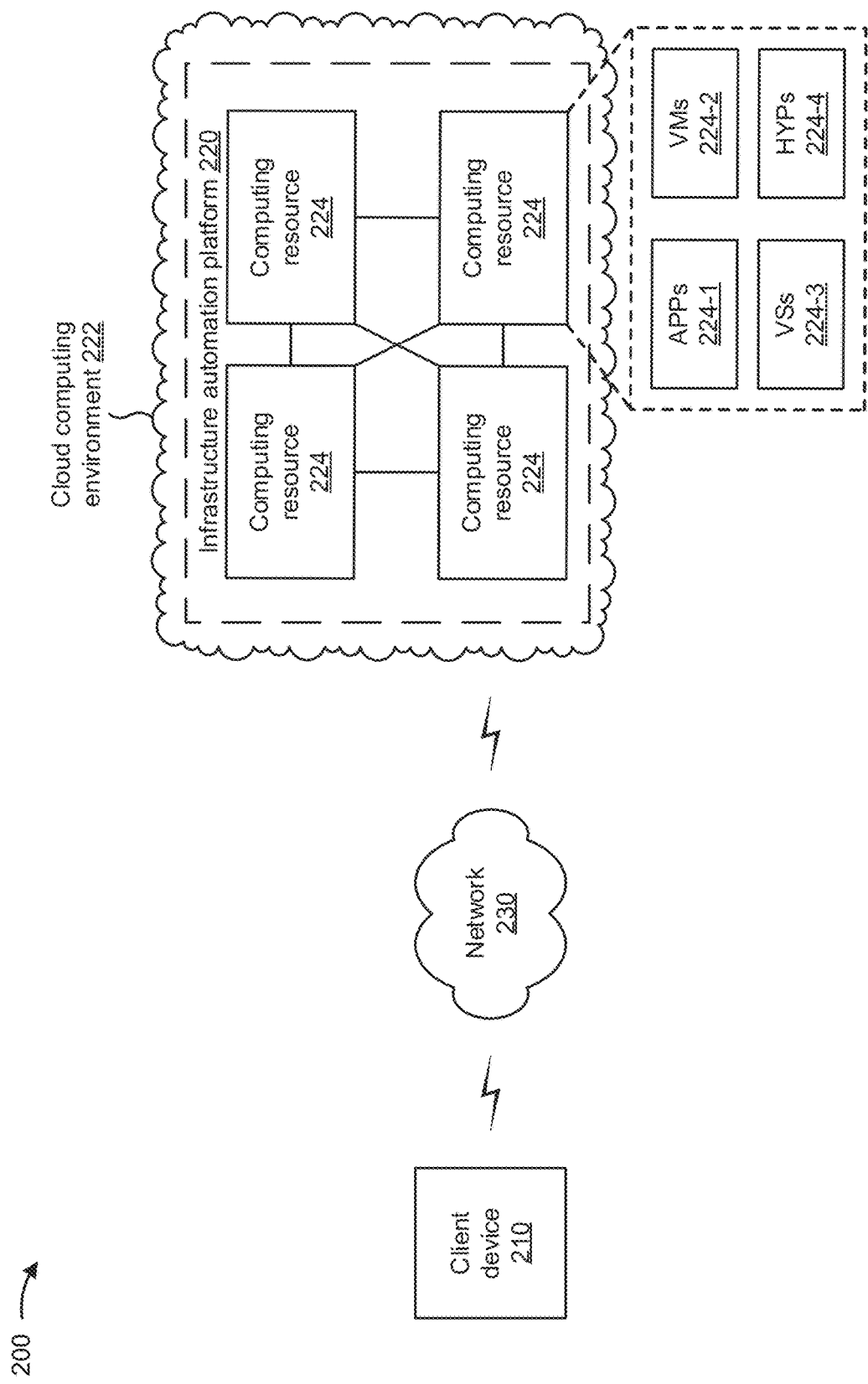
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, an infrastructure automation platform 220, and a network 230. Devices of environment 200 may interconnect via wired connections, wireless connections, or a combination of wired and wireless connections.

Client device 210 includes one or more devices capable of receiving, generating, storing, processing, and/or providing information, such as information described herein. For example, client device 210 may include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, and/or the like), or a similar type of device. In some implementations, client device 210 may receive information from and/or transmit information to infrastructure automation platform 220.

Infrastructure automation platform 220 includes one or more devices that utilize natural language processing and machine learning to assist in performing actions in response to tasks. In some implementations, infrastructure automation platform 220 may be designed to be modular such that certain software components may be swapped in or out depending on a particular need. As such, infrastructure automation platform 220 may be easily and/or quickly reconfigured for different uses. In some implementations, infrastructure automation platform 220 may receive information from and/or transmit information to one or more client devices 210.

In some implementations, as shown, infrastructure automation platform 220 may be hosted in a cloud computing environment 222. Notably, while implementations described herein describe infrastructure automation platform 220 as being hosted in cloud computing environment 222, in some implementations, infrastructure automation platform 220 may not be cloud-based (i.e., may be implemented outside of a cloud computing environment) or may be partially cloud-based.

Cloud computing environment 222 includes an environment that hosts infrastructure automation platform 220. Cloud computing environment 222 may provide computation, software, data access, storage, etc., services that do not require end-user knowledge of a physical location and configuration of system(s) and/or device(s) that hosts infrastructure automation platform 220. As shown, cloud computing environment 222 may include a group of computing resources 224 (referred to collectively as "computing resources 224" and individually as "computing resource 224").

Computing resource 224 includes one or more personal computers, workstation computers, mainframe devices, or other types of computation and/or communication devices. In some implementations, computing resource 224 may host infrastructure automation platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by client device 210. Application 224-1 may eliminate a need to install and execute the software applications on client device 210. For example, application 224-1 may include software associated with infrastructure automation platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program and may support a single process. In some implementations, virtual machine 224-2 may execute on behalf of a user (e.g., a user of client device 210 or an operator of infrastructure automation platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
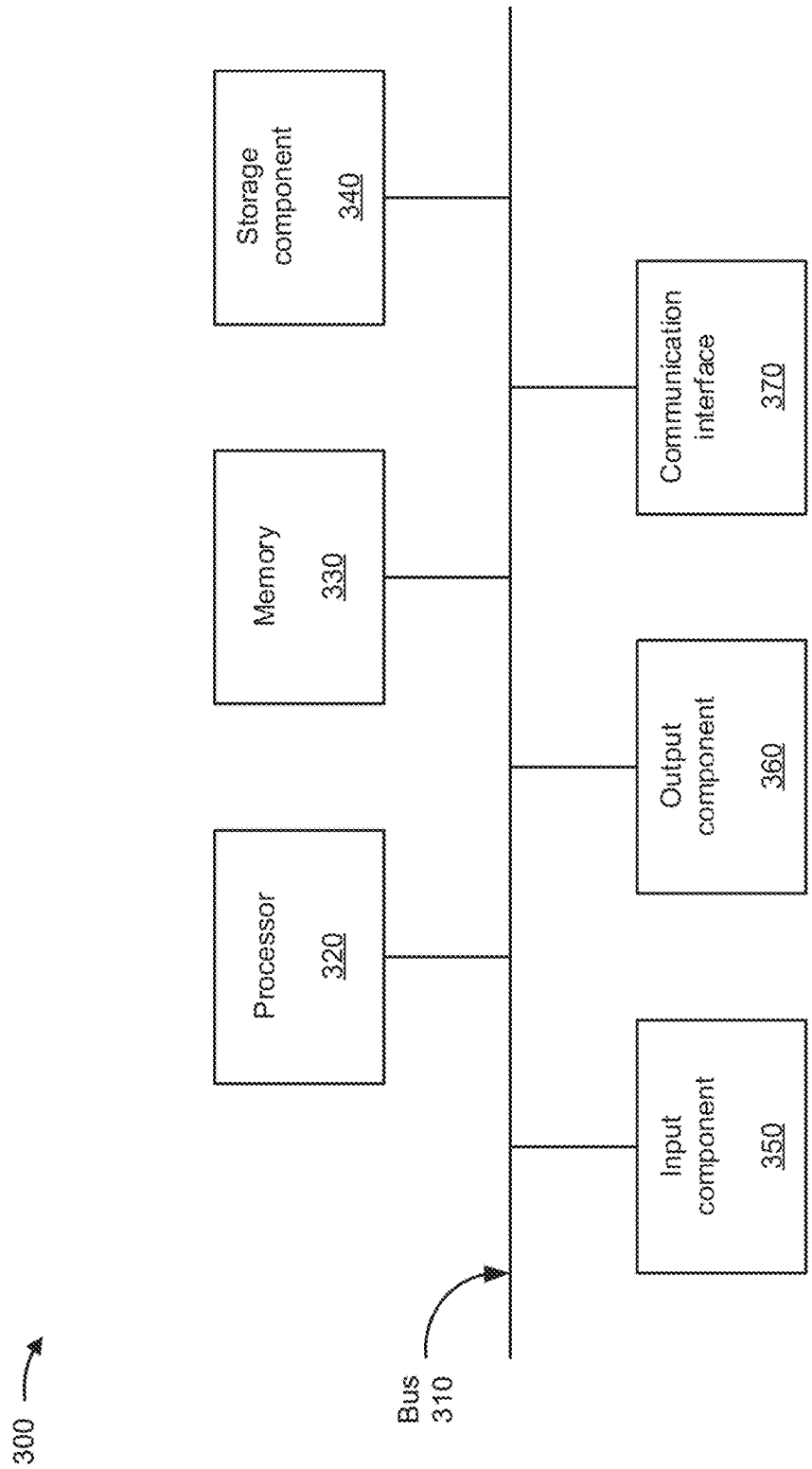
FIG. 3 is a diagram of example components of one or more devices of FIG. 2.

FIG. 3 is a diagram of example components of a device 300. Device 300 may correspond to client device 210, infrastructure automation platform 220, and/or computing resource 224. In some implementations, client device 210, infrastructure automation platform 220, and/or computing resource 224 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
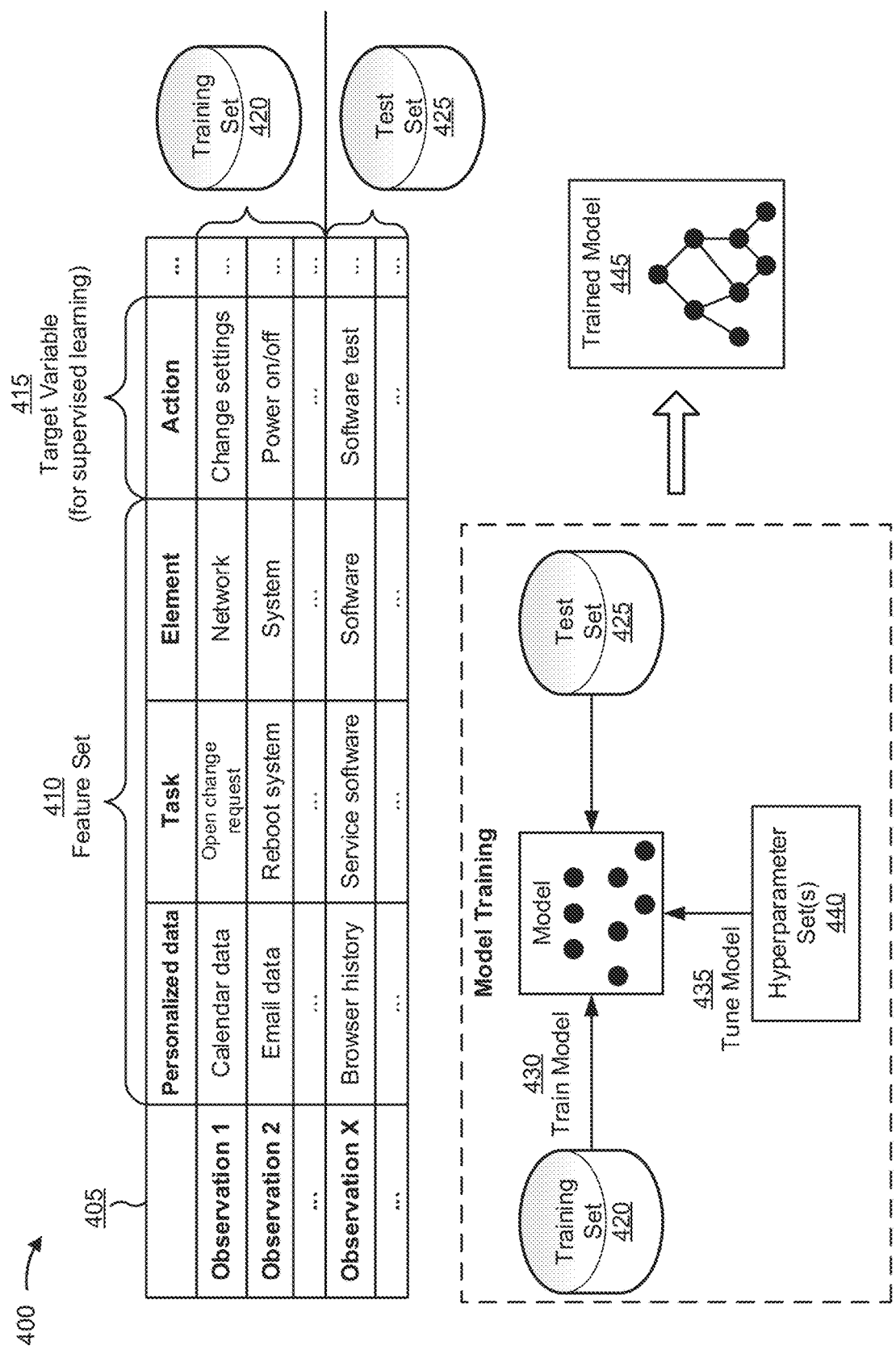
FIG. 4 is a diagram illustrating an example of training a machine learning model.

FIG. 4 is a diagram illustrating an example 400 of training a machine learning model. The machine learning model training described herein may be performed using a machine learning system. The machine learning system may include a computing device, a server, a cloud computing environment, and/or the like, such as client device 210 and/or infrastructure automation platform 220.

As shown by reference number 405, a machine learning model may be trained using a set of observations. The set of observations may be obtained and/or input from historical data, such as data gathered during one or more processes described herein. For example, the set of observations may include data gathered from user interaction with and/or user input to infrastructure automation platform 220, as described elsewhere herein. In some implementations, the machine learning system may receive the set of observations (e.g., as input) from client devices 210.

As shown by reference number 410, a feature set may be derived from the set of observations. The feature set may include a set of variable types. A variable type may be referred to as a feature. A specific observation may include a set of variable values corresponding to the set of variable types. A set of variable values may be specific to an observation. In some cases, different observations may be associated with different sets of variable values, sometimes referred to as feature values. In some implementations, the machine learning system may determine variable values for a specific observation based on input received from client devices 210. For example, the machine learning system may identify a feature set (e.g., one or more features and/or corresponding feature values) from structured data input to the machine learning system, such as by extracting data from a particular column of a table, extracting data from a particular field of a form, extracting data from a particular field of a message, extracting data received in a structured data format, and/or the like. In some implementations, the machine learning system may determine features (e.g., variables types) for a feature set based on input received from client devices 210, such as by extracting or generating a name for a column, extracting or generating a name for a field of a form and/or a message, extracting or generating a name based on a structured data format, and/or the like. Additionally, or alternatively, the machine learning system may receive input from an operator to determine features and/or feature values. In some implementations, the machine learning system may perform natural language processing and/or another feature identification technique to extract features (e.g., variable types) and/or feature values (e.g., variable values) from text (e.g., unstructured data) input to the machine learning system, such as by identifying keywords and/or values associated with those keywords from the text.

As an example, a feature set for a set of observations may include a first feature of personalized data, a second feature of a task, a third feature of an element, and so on. As shown, for a first observation, the first feature may have a value of calendar data, the second feature may have a value of object change request, the third feature may have a value of network, and so on. These features and feature values are provided as examples, and may differ in other examples. For example, the feature set may include one or more of the following features: personalized data (e.g., inbound email data, outbound email data, calendar data, browser history data, system data, application data, file structure, and/or the like); tasks (e.g., perform a change request, replace a device, reboot a device, reboot a system, service software, test software, and/or the like); elements (e.g., networks, network devices, systems, software, and/or the like); and/or the like. In some implementations, the machine learning system may pre-process and/or perform dimensionality reduction to reduce the feature set and/or combine features of the feature set to a minimum feature set. A machine learning model may be trained on the minimum feature set, thereby conserving resources of the machine learning system (e.g., processing resources, memory, and/or the like) used to train the machine learning model.

As shown by reference number 415, the set of observations may be associated with a target variable type (e.g., an action). The target variable type may represent a variable having a numeric value (e.g., an integer value, a floating point value, and/or the like), may represent a variable having a numeric value that falls within a range of values or has some discrete possible values, may represent a variable that is selectable from one of multiple options (e.g., one of multiples classes, classifications, labels, and/or the like), may represent a variable having a Boolean value (e.g., 0 or 1, True or False, Yes or No), and/or the like. A target variable type may be associated with a target variable value, and a target variable value may be specific to an observation. In some cases, different observations (e.g., change network settings, power a system on and off, perform a software test, and/or the like) may be associated with different target variable values.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model, a predictive model, and/or the like. When the target variable type is associated with continuous target variable values (e.g., a range of numbers and/or the like), the machine learning model may employ a regression technique. When the target variable type is associated with categorical target variable values (e.g., classes, labels, and/or the like), the machine learning model may employ a classification technique.

In some implementations, the machine learning model may be trained on a set of observations that do not include a target variable (or that include a target variable, but the machine learning model is not being executed to predict the target variable). This may be referred to as an unsupervised learning model, an automated data analysis model, an automated signal extraction model, and/or the like. In this case, the machine learning model may learn patterns from the set of observations without labeling or supervision, and may provide output that indicates such patterns, such as by using clustering and/or association to identify related groups of items within the set of observations.

As further shown, the machine learning system may partition the set of observations into a training set 420 that includes a first subset of observations, of the set of observations, and a test set 425 that includes a second subset of observations of the set of observations. The training set 420 may be used to train (e.g., fit, tune, and/or the like) the machine learning model, while the test set 425 may be used to evaluate a machine learning model that is trained using the training set 420. For example, for supervised learning, the test set 420 may be used for initial model training using the first subset of observations, and the test set 425 may be used to test whether the trained model accurately predicts target variables in the second subset of observations. In some implementations, the machine learning system may partition the set of observations into the training set 420 and the test set 425 by including a first portion or a first percentage of the set of observations in the training set 420 (e.g., 75%, 80%, or 85%, among other examples) and including a second portion or a second percentage of the set of observations in the test set 425 (e.g., 25%, 20%, or 15%, among other examples). In some implementations, the machine learning system may randomly select observations to be included in the training set 420 and/or the test set 425.

As shown by reference number 430, the machine learning system may train a machine learning model using the training set 420. This training may include executing, by the machine learning system, a machine learning algorithm to determine a set of model parameters based on the training set 420. In some implementations, the machine learning algorithm may include a regression algorithm (e.g., linear regression, logistic regression, and/or the like), which may include a regularized regression algorithm (e.g., Lasso regression, Ridge regression, Elastic-Net regression, and/or the like). Additionally, or alternatively, the machine learning algorithm may include a decision tree algorithm, which may include a tree ensemble algorithm (e.g., generated using bagging and/or boosting), a random forest algorithm, a boosted trees algorithm, and/or the like. A model parameter may include an attribute of a machine learning model that is learned from data input into the model (e.g., the training set 420). For example, for a regression algorithm, a model parameter may include a regression coefficient (e.g., a weight). For a decision tree algorithm, a model parameter may include a decision tree split location, as an example.

As shown by reference number 435, the machine learning system may use one or more hyperparameter sets 440 to tune the machine learning model. A hyperparameter may include a structural parameter that controls execution of a machine learning algorithm by the machine learning system, such as a constraint applied to the machine learning algorithm. Unlike a model parameter, a hyperparameter is not learned from data input into the model. An example hyperparameter for a regularized regression algorithm includes a strength (e.g., a weight) of a penalty applied to a regression coefficient to mitigate overfitting of the machine learning model to the training set 420. The penalty may be applied based on a size of a coefficient value (e.g., for Lasso regression, such as to penalize large coefficient values), may be applied based on a squared size of a coefficient value (e.g., for Ridge regression, such as to penalize large squared coefficient values), may be applied based on a ratio of the size and the squared size (e.g., for Elastic-Net regression), may be applied by setting one or more feature values to zero (e.g., for automatic feature selection), and/or the like. Example hyperparameters for a decision tree algorithm include a tree ensemble technique to be applied (e.g., bagging, boosting, a random forest algorithm, a boosted trees algorithm, and/or the like), a number of features to evaluate, a number of observations to use, a maximum depth of each decision tree (e.g., a number of branches permitted for the decision tree), a number of decision trees to include in a random forest algorithm, and/or the like.

To train a machine learning model, the machine learning system may identify a set of machine learning algorithms to be trained (e.g., based on operator input that identifies the one or more machine learning algorithms, based on random selection of a set of machine learning algorithms, and/or the like), and may train the set of machine learning algorithms (e.g., independently for each machine learning algorithm in the set) using the training set 420. The machine learning system may tune each machine learning algorithm using one or more hyperparameter sets 440 (e.g., based on operator input that identifies hyperparameter sets 440 to be used, based on randomly generating hyperparameter values, and/or the like). The machine learning system may train a particular machine learning model using a specific machine learning algorithm and a corresponding hyperparameter set 440. In some implementations, the machine learning system may train multiple machine learning models to generate a set of model parameters for each machine learning model, where each machine learning model corresponds to a different combination of a machine learning algorithm and a hyperparameter set 440 for that machine learning algorithm.

In some implementations, the machine learning system may perform cross-validation when training a machine learning model. Cross validation can be used to obtain a reliable estimate of machine learning model performance using only the training set 420, and without using the test set 425, such as by splitting the training set 420 into a number of groups (e.g., based on operator input that identifies the number of groups, based on randomly selecting a number of groups, and/or the like) and using those groups to estimate model performance. For example, using k-fold cross-validation, observations in the training set 420 may be split into k groups (e.g., in order or at random). For a training procedure, one group may be marked as a hold-out group, and the remaining groups may be marked as training groups. For the training procedure, the machine learning system may train a machine learning model on the training groups and then test the machine learning model on the hold-out group to generate a cross-validation score. The machine learning system may repeat this training procedure using different hold-out groups and different test groups to generate a cross-validation score for each training procedure. In some implementations, the machine learning system may independently train the machine learning model k times, with each individual group being used as a hold-out group once and being used as a training group k−1 times. The machine learning system may combine the cross-validation scores for each training procedure to generate an overall cross-validation score for the machine learning model. The overall cross-validation score may include, for example, an average cross-validation score (e.g., across all training procedures), a standard deviation across cross-validation scores, a standard error across cross-validation scores, and/or the like.

In some implementations, the machine learning system may perform cross-validation when training a machine learning model by splitting the training set into a number of groups (e.g., based on operator input that identifies the number of groups, based on randomly selecting a number of groups, and/or the like). The machine learning system may perform multiple training procedures and may generate a cross-validation score for each training procedure. The machine learning system may generate an overall cross-validation score for each hyperparameter set 440 associated with a particular machine learning algorithm. The machine learning system may compare the overall cross-validation scores for different hyperparameter sets 440 associated with the particular machine learning algorithm, and may select the hyperparameter set 440 with the best (e.g., highest accuracy, lowest error, closest to a desired threshold, and/or the like) overall cross-validation score for training the machine learning model. The machine learning system may then train the machine learning model using the selected hyperparameter set 440, without cross-validation (e.g., using all data in the training set 420 without any hold-out groups), to generate a single machine learning model for a particular machine learning algorithm. The machine learning system may then test this machine learning model using the test set 425 to generate a performance score, such as a mean squared error (e.g., for regression), a mean absolute error (e.g., for regression), an area under receiver operating characteristic curve (e.g., for classification), and/or the like. If the machine learning model performs adequately (e.g., with a performance score that satisfies a threshold), then the machine learning system may store that machine learning model as a trained machine learning model 445 to be used to analyze new observations, as described below in connection with FIG. 5.

In some implementations, the machine learning system may perform cross-validation, as described above, for multiple machine learning algorithms (e.g., independently), such as a regularized regression algorithm, different types of regularized regression algorithms, a decision tree algorithm, different types of decision tree algorithms, and/or the like. Based on performing cross-validation for multiple machine learning algorithms, the machine learning system may generate multiple machine learning models, where each machine learning model has the best overall cross-validation score for a corresponding machine learning algorithm. The machine learning system may then train each machine learning model using the entire training set 420 (e.g., without cross-validation), and may test each machine learning model using the test set 425 to generate a corresponding performance score for each machine learning model. The machine learning model may compare the performance scores for each machine learning model, and may select the machine learning model with the best (e.g., highest accuracy, lowest error, closest to a desired threshold, and/or the like) performance score as the trained machine learning model 445.

As indicated above, FIG. 4 is provided as an example. Other examples may differ from what is described in connection with FIG. 4. For example, the machine learning model may be trained using a different process than what is described in connection with FIG. 4. Additionally, or alternatively, the machine learning model may employ a different machine learning algorithm than what is described in connection with FIG. 4, such as a Bayesian estimation algorithm, a k-nearest neighbor algorithm, an a priori algorithm, a k-means algorithm, a support vector machine algorithm, a neural network algorithm (e.g., a convolutional neural network algorithm), a deep learning algorithm, and/or the like.

Figure 5:
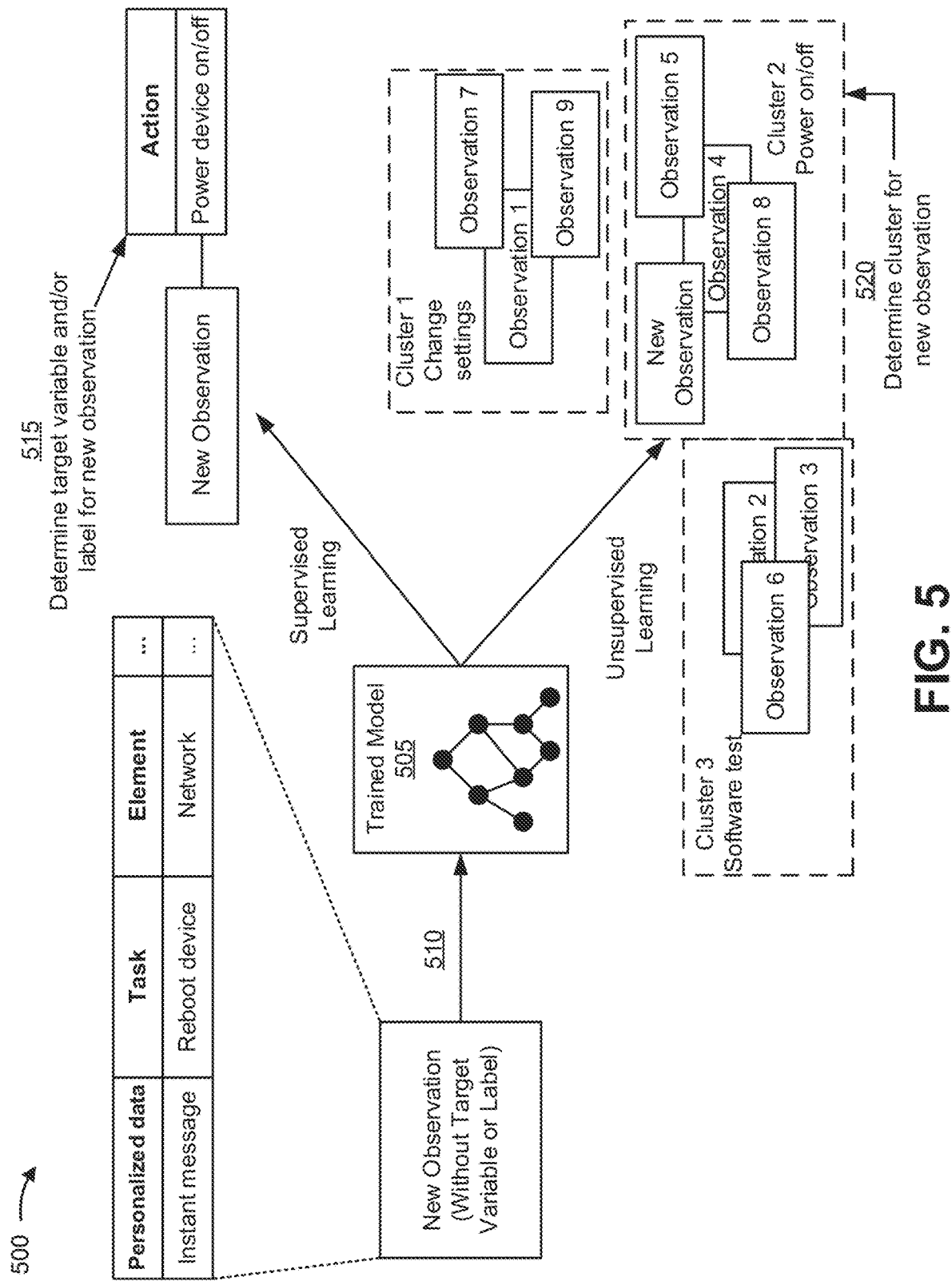
FIG. 5 is a diagram illustrating an example of applying a trained machine learning model to a new observation.

FIG. 5 is a diagram illustrating an example 500 of applying a trained machine learning model to a new observation. The new observation may be input to a machine learning system that stores a trained machine learning model 505. In some implementations, the trained machine learning model 505 may be the trained machine learning model 445 described above in connection with FIG. 4. The machine learning system may include a computing device, a server, a cloud computing environment, and/or the like, such as infrastructure automation platform 220.

As shown by reference number 510, the machine learning system may receive a new observation (or a set of new observations), and may input the new observation to the machine learning model 505. As shown, the new observation may include a first feature of personalized data (e.g., instant message data), a second feature of a task (e.g., reboot a network device), a third feature of an element (e.g., a network), and so on, as an example. The machine learning system may apply the trained machine learning model 505 to the new observation to generate an output (e.g., a result). The type of output may depend on the type of machine learning model and/or the type of machine learning task being performed. For example, the output may include a predicted (e.g., estimated) value of a target variable (e.g., a value within a continuous range of values, a discrete value, a label, a class, a classification, and/or the like), such as when supervised learning is employed. Additionally, or alternatively, the output may include information that identifies a cluster to which the new observation belongs, information that indicates a degree of similarity between the new observations and one or more prior observations (e.g., which may have previously been new observations input to the machine learning model and/or observations used to train the machine learning model), and/or the like, such as when unsupervised learning is employed.

In some implementations, the trained machine learning model 505 may predict "power device on and off" for the target variable of an action for the new observation, as shown by reference number 515. Based on this prediction (e.g., based on the value having a particular label/classification, based on the value satisfying or failing to satisfy a threshold, and/or the like), the machine learning system may provide a recommendation, such as power the network device on and off, replace the network device, install new software on the network device, and/or the like. Additionally, or alternatively, the machine learning system may perform an automated action and/or may cause an automated action to be performed (e.g., by instructing another device to perform the automated action), such as powering the network device on and off, causing the network device to be replaced, installing new software on the network device, and/or the like. As another example, if the machine learning system were to predict a value of "service the network device" for the target variable of an action, then the machine learning system may provide a different recommendation (e.g., service the network device) and/or may perform or cause performance of a different automated action (e.g., causing an unmanned vehicle to service the network device or change settings of the network device). In some implementations, the recommendation and/or the automated action may be based on the target variable value having a particular label (e.g., classification, categorization, and/or the like), may be based on whether the target variable value satisfies one or more thresholds (e.g., whether the target variable value is greater than a threshold, is less than a threshold, is equal to a threshold, falls within a range of threshold values, and/or the like), and/or the like.

In some implementations, the trained machine learning model 505 may classify (e.g. cluster) the new observation in an action cluster, as shown by reference number 520. The observations within a cluster may have a threshold degree of similarity. Based on classifying the new observation in the action cluster, the machine learning system may provide a recommendation, such as change settings for a network device, power the network device on and off, perform a software test for the network device, and/or the like. Additionally, or alternatively, the machine learning system may perform an automated action and/or may cause an automated action to be performed (e.g., by instructing another device to perform the automated action), such as changing settings for a network device, powering the network device on and off, performing a software test for the network device, and/or the like. As another example, if the machine learning system were to classify the new observation in another action cluster, then the machine learning system may provide a different recommendation (e.g., replace the network device) and/or may perform or cause performance of a different automated action (e.g., causing an unmanned vehicle to replace the network device, changing settings or upgrading firmware of the network device by automatically dispatching a technician or by executing a script or a program, and/or the like).

In this way, the machine learning system may apply a rigorous and automated process to cause actions to be automatically performed in response to tasks. The machine learning system enables recognition and/or identification of tens, hundreds, thousands, or millions of features and/or feature values for tens, hundreds, thousands, or millions of observations, thereby increasing an accuracy and consistency of causing actions to be automatically performed in response to tasks relative to requiring computing resources to be allocated for tens, hundreds, or thousands of operators to manually cause actions to be performed in response to tasks using the features or feature values.

As indicated above, FIG. 5 is provided as an example. Other examples may differ from what is described in connection with FIG. 5.

Figure 6:
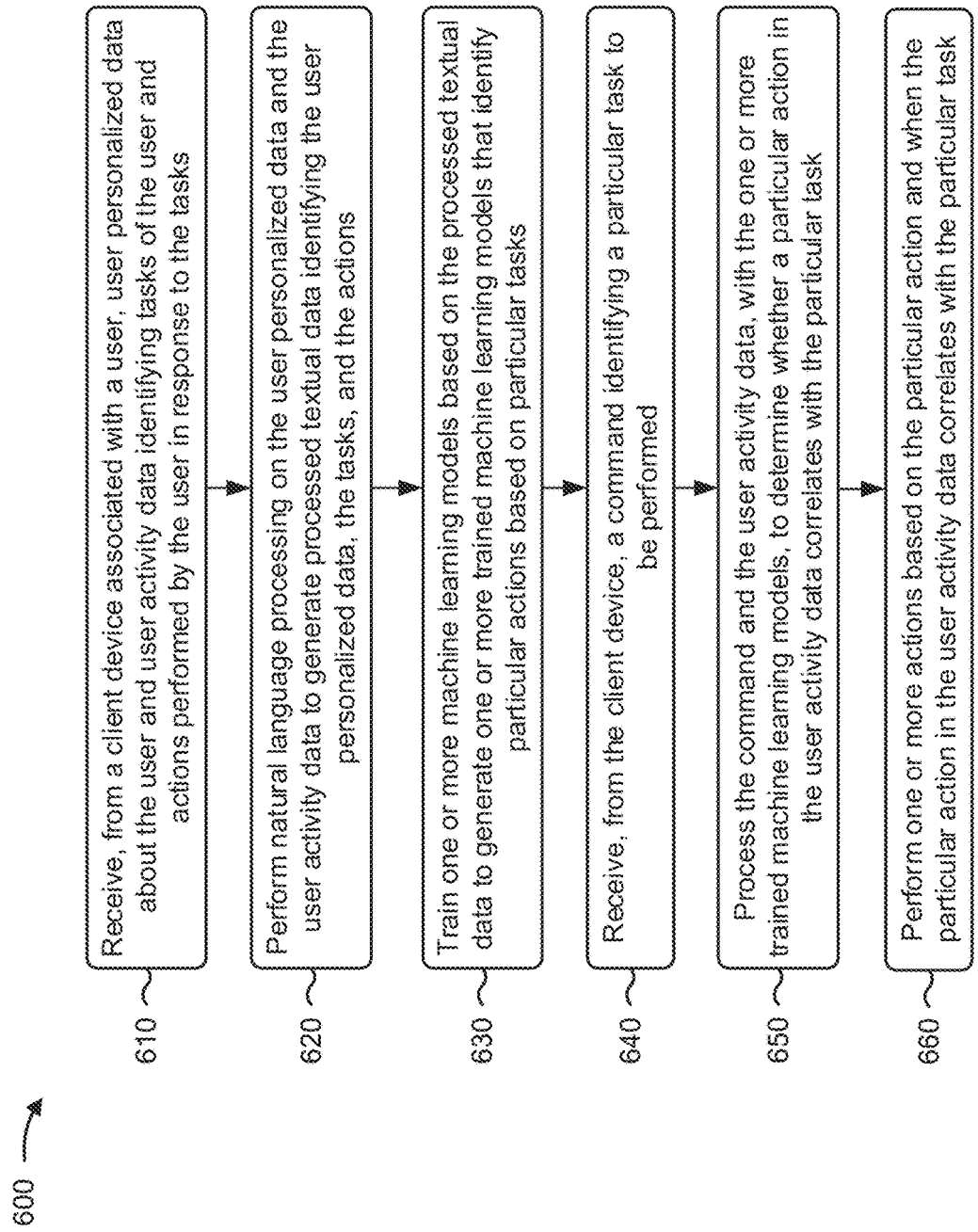
FIGS. 6-8 are flow charts of example processes for utilizing natural language processing and machine learning to assist in performing actions in response to tasks.

FIG. 6 is a flow chart of an example process 600 for utilizing natural language processing and machine learning to assist in performing actions in response to tasks. In some implementations, one or more process blocks of FIG. 6 may be performed by a device (e.g., infrastructure automation platform 220). In some implementations, one or more process blocks of FIG. 6 may be performed by another device or a group of devices separate from or including the device, such as a client device (e.g., client device 210).

As shown in FIG. 6, process 600 may include receiving, from a client device associated with a user, user personalized data about the user and user activity data identifying tasks of the user and actions performed by the user in response to the tasks (block 610). For example, the device (e.g., using computing resource 224, processor 320, communication interface 370, and/or the like) may receive, from a client device associated with a user, user personalized data about the user and user activity data identifying tasks of the user and actions performed by the user in response to the tasks, as described above.

As further shown in FIG. 6, process 600 may include performing natural language processing on the user personalized data and the user activity data to generate processed textual data identifying the user personalized data, the tasks, and the actions (block 620). For example, the device (e.g., using computing resource 224, processor 320, memory 330, and/or the like) may perform natural language processing on the user personalized data and the user activity data to generate processed textual data identifying the user personalized data, the tasks, and the actions, as described above.

As further shown in FIG. 6, process 600 may include training one or more machine learning models based on the processed textual data to generate one or more trained machine learning models that identify particular actions based on particular tasks (block 630). For example, the device (e.g., using computing resource 224, processor 320, storage component 340, and/or the like) may train one or more machine learning models based on the processed textual data to generate one or more trained machine learning models that identify particular actions based on particular tasks, as described above.

As further shown in FIG. 6, process 600 may include receiving, from the client device, a command identifying a particular task to be performed (block 640). For example, the device (e.g., using computing resource 224, processor 320, communication interface 370, and/or the like) may receive, from the client device, a command identifying a particular task to be performed, as described above.

As further shown in FIG. 6, process 600 may include processing the command and the user activity data, with the one or more trained machine learning models, to determine whether a particular action in the user activity data correlates with the particular task (block 650). For example, the device (e.g., using computing resource 224, processor 320, storage component 340, and/or the like) may process the command and the user activity data, with the one or more trained machine learning models, to determine whether a particular action in the user activity data correlates with the particular task, as described above.

As further shown in FIG. 6, process 600 may include performing one or more actions based on the particular action and when the particular action in the user activity data correlates with the particular task (block 660). For example, the device (e.g., using computing resource 224, processor 320, memory 330, storage component 340, communication interface 370, and/or the like) may perform one or more actions based on the particular action and when the particular action in the user activity data correlates with the particular task, as described above.

Process 600 may include additional implementations, such as any single implementation or any combination of implementations described below and/or in connection with one or more other processes described elsewhere herein.

In a first implementation, the command is a textual command and processing the command and the user activity data with the one or more trained machine learning models may include processing the textual command, with a first trained machine learning model of the one or more trained machine learning models, to identify an intended task of the textual command; and processing the intended task and the user activity data, with a second trained machine learning model of the one or more trained machine learning models, to determine whether a particular action in the user activity data correlates with the intended task.

In a second implementation, alone or in combination with the first implementation, performing the one or more actions may include causing the particular action to be automatically implemented; or processing the particular action, with a natural language generation model, to convert the particular action into a natural language response and to provide the natural language response to the client device.

In a third implementation, alone or in combination with one or more of the first and second implementations, performing the one or more actions may include providing, to the client device, instructions for performing the particular action; automatically causing the client device to perform the particular action; or receiving and analyzing feedback associated with performance of the particular action.

In a fourth implementation, alone or in combination with one or more of the first through third implementations, performing the one or more actions may include automatically dispatching a robot, an unmanned vehicle, or a technician to perform the particular action; updating a data structure based on feedback associated with performance of the particular action, wherein the data structure stores the processed textual data; or retraining the one or more machine learning models based on the particular action and based on feedback associated with performance of the particular action.

In a fifth implementation, alone or in combination with one or more of the first through fourth implementations, the command is a text-based command and processing the command includes performing natural language processing on the text-based command to identify an intent of text-based command.

In a sixth implementation, alone or in combination with one or more of the first through fifth implementations, process 600 includes receiving an image of a user-provided object prior to receipt of the command or with receipt of the command, performing image recognition of the image of the user-provided object, and determining whether the user is authenticated based on performing the image recognition of the image of the user-provided object.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
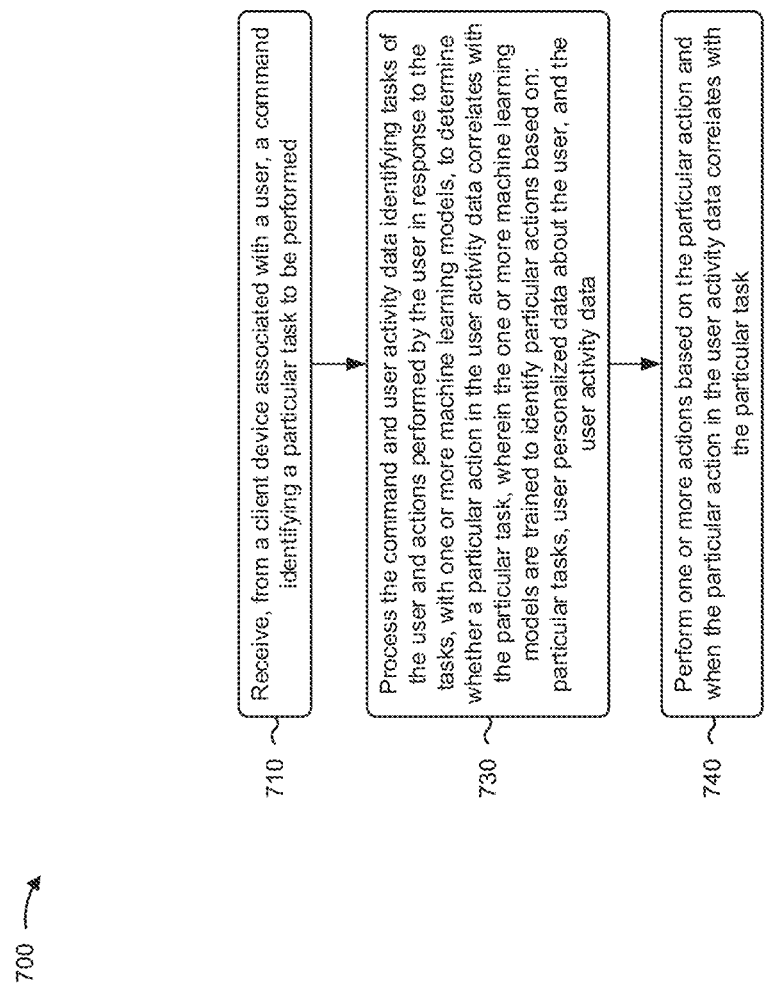

FIG. 7 is a flow chart of an example process 700 for utilizing natural language processing and machine learning to assist in performing actions in response to tasks. In some implementations, one or more process blocks of FIG. 7 may be performed by a device (e.g., infrastructure automation platform 220). In some implementations, one or more process blocks of FIG. 7 may be performed by another device or a group of devices separate from or including the device, such as a client device (e.g., client device 210).

As shown in FIG. 7, process 700 may include receiving, from a client device associated with a user, a command identifying a particular task to be performed (block 710). For example, the device (e.g., using computing resource 224, processor 320, communication interface 370, and/or the like) may receive, from a client device associated with a user, a command identifying a particular task to be performed, as described above.

As further shown in FIG. 7, process 700 may include processing the command and user activity data identifying tasks of the user and actions performed by the user in response to the tasks, with one or more machine learning models, to determine whether a particular action in the user activity data correlates with the particular task, wherein the one or more machine learning models are trained to identify particular actions based on particular tasks, user personalized data about the user, and the user activity data (block 720). For example, the device (e.g., using computing resource 224, processor 320, storage component 340, and/or the like) may process the command and user activity data identifying tasks of the user and actions performed by the user in response to the tasks, with one or more machine learning models, to determine whether a particular action in the user activity data correlates with the particular task, as described above. In some implementations, the one or more machine learning models may be trained to identify particular actions based on particular tasks, user personalized data about the user, and the user activity data.

As further shown in FIG. 7, process 700 may include performing one or more actions based on the particular action and when the particular action in the user activity data correlates with the particular task (block 730). For example, the device (e.g., using computing resource 224, processor 320, memory 330, storage component 340, communication interface 370, and/or the like) may perform one or more actions based on the particular action and when the particular action in the user activity data correlates with the particular task, as described above.

Process 700 may include additional implementations, such as any single implementation or any combination of implementations described below and/or in connection with one or more other processes described elsewhere herein.

In a first implementation, process 700 may include determining that the particular action in the user activity data fails to correlate with the particular task; and providing, to the client device, a request to provide a new action for satisfying the particular task.

In a second implementation, alone or in combination with the first implementation, process 700 may include receiving, from the client device, information indicating the new action for satisfying the particular task; and causing the new action to be automatically implemented.

In a third implementation, alone or in combination with one or more of the first and second implementations, process 700 may include receiving, from the client device, information indicating the new action for satisfying the particular task; updating a data structure based on the new action and based on performance of the new action, wherein the data structure is storing the user activity data; and retraining the one or more machine learning models based on the new action and based on feedback associated with performance of the new action.

In a fourth implementation, alone or in combination with one or more of the first through third implementations, the user personalized data may include data identifying inbound email data associated with the user, outbound email data associated with the user, calendar data associated with the user, browser history data associated with the user, system data associated with the user, software data associated with the user, voice data associated with a voice of the user, image data associated with a face of the user, data identifying reasons for which the user communicates with other users, data identifying frequent contacts of the user, or data identifying an organizational hierarchy associated with the user.

In a fifth implementation, alone or in combination with one or more of the first through fourth implementations, process 700 may include storing the user personalized data and the user activity data in a data structure that is updated based on user actions and feedback associated with performance of the user actions.

In a sixth implementation, alone or in combination with one or more of the first through fifth implementations, the one or more machine learning models may include a clustering model, a decision tree model, a k-means model, a natural language processing model, or a natural language generation model.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Figure 8:
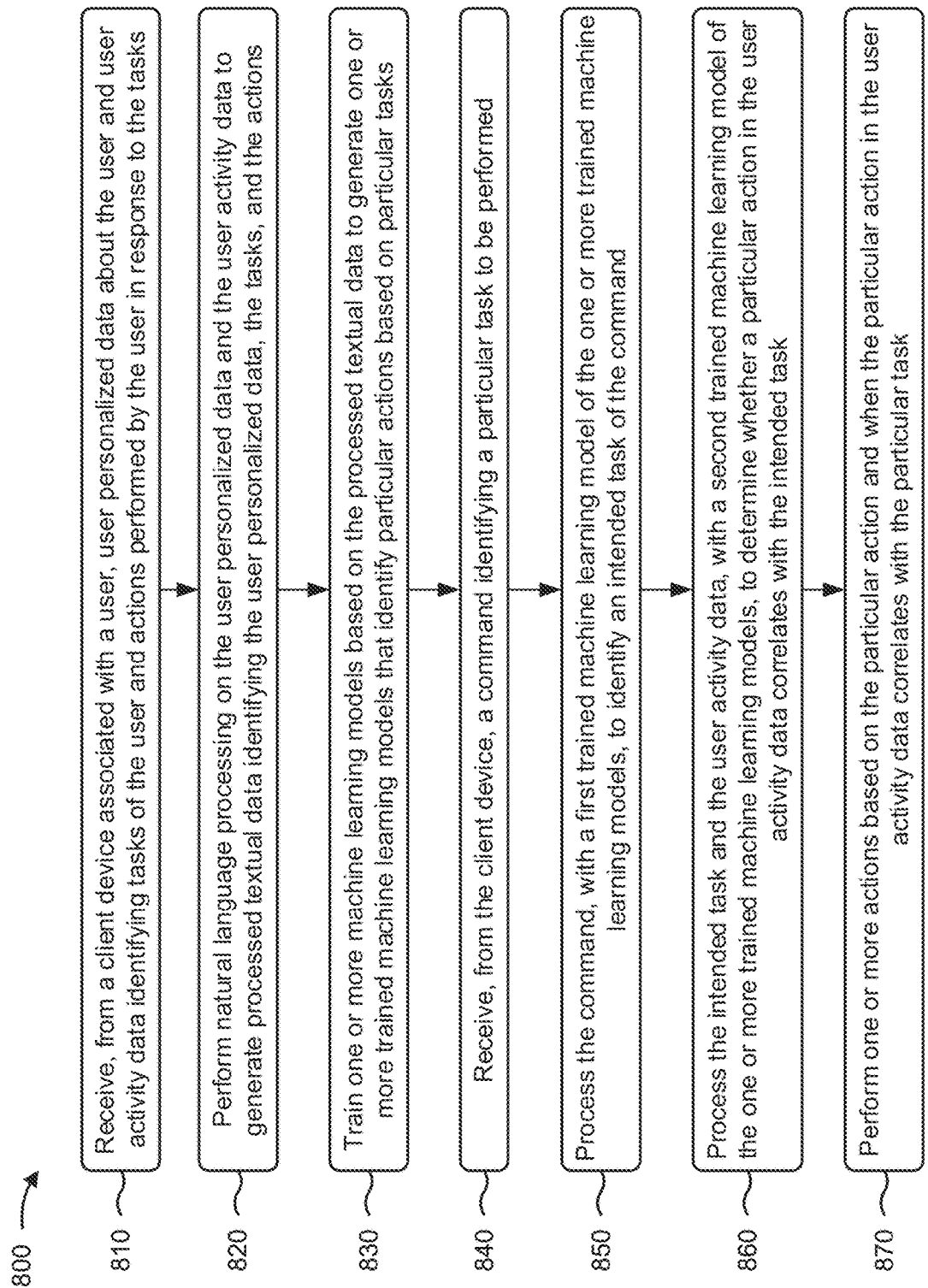

FIG. 8 is a flow chart of an example process 800 for utilizing natural language processing and machine learning to assist in performing actions in response to tasks. In some implementations, one or more process blocks of FIG. 8 may be performed by a device (e.g., infrastructure automation platform 220). In some implementations, one or more process blocks of FIG. 8 may be performed by another device or a group of devices separate from or including the device, such as a client device (e.g., client device 210).

As shown in FIG. 8, process 800 may include receiving, from a client device associated with a user, user personalized data about the user and user activity data identifying tasks of the user and actions performed by the user in response to the tasks (block 810). For example, the device (e.g., using computing resource 224, processor 320, communication interface 370, and/or the like) may receive, from a client device associated with a user, user personalized data about the user and user activity data identifying tasks of the user and actions performed by the user in response to the tasks, as described above.

As further shown in FIG. 8, process 800 may include performing natural language processing on the user personalized data and the user activity data to generate processed textual data identifying the user personalized data, the tasks, and the actions (block 820). For example, the device (e.g., using computing resource 224, processor 320, memory 330, and/or the like) may perform natural language processing on the user personalized data and the user activity data to generate processed textual data identifying the user personalized data, the tasks, and the actions, as described above.

As further shown in FIG. 8, process 800 may include training one or more machine learning models based on the processed textual data to generate one or more trained machine learning models that identify particular actions based on particular tasks (block 830). For example, the device (e.g., using computing resource 224, processor 320, storage component 340, and/or the like) may train one or more machine learning models based on the processed textual data to generate one or more trained machine learning models that identify particular actions based on particular tasks, as described above.

As further shown in FIG. 8, process 800 may include receiving, from the client device, a command identifying a particular task to be performed (block 840). For example, the device (e.g., using computing resource 224, processor 320, communication interface 370, and/or the like) may receive, from the client device, a command identifying a particular task to be performed, as described above.

As further shown in FIG. 8, process 800 may include processing the command, with a first trained machine learning model of the one or more trained machine learning models, to identify an intended task of the command (block 850). For example, the device (e.g., using computing resource 224, processor 320, storage component 340, and/or the like) may process the command, with a first trained machine learning model of the one or more trained machine learning models, to identify an intended task of the command, as described above.

As further shown in FIG. 8, process 800 may include processing the intended task and the user activity data, with a second trained machine learning model of the one or more trained machine learning models, to determine whether a particular action in the user activity data correlates with the intended task (block 860). For example, the device (e.g., using computing resource 224, processor 320, memory 330, and/or the like) may process the intended task and the user activity data, with a second trained machine learning model of the one or more trained machine learning models, to determine whether a particular action in the user activity data correlates with the intended task, as described above.

As further shown in FIG. 8, process 800 may include performing one or more actions based on the particular action and when the particular action in the user activity data correlates with the particular task (block 870). For example, the device (e.g., using computing resource 224, processor 320, memory 330, storage component 340, communication interface 370, and/or the like) may perform one or more actions based on the particular action and when the particular action in the user activity data correlates with the particular task, as described above.

Process 800 may include additional implementations, such as any single implementation or any combination of implementations described below and/or in connection with one or more other processes described elsewhere herein.

In a first implementation, performing the one or more actions may include causing the particular action to be automatically implemented; or processing the particular action, with a natural language generation model, to convert the particular action into a natural language response and to provide the natural language response to the client device.

In a second implementation, performing the one or more actions may include providing, to the client device, instructions for performing the particular action; automatically causing the client device to perform the particular action;

receiving and analyzing feedback associated with performance of the particular action; automatically dispatching a robot, an unmanned vehicle, or a technician to perform the particular action; updating a data structure based on feedback associated with performance of the particular action, wherein the data structure stores the processed textual data; or retraining the one or more machine learning models based on the particular action and based on feedback associated with performance of the particular action.

In a third implementation, alone or in combination with one or more of the first and second implementations, process 800 may include receiving an image of a face of the user prior to receipt of the command or with receipt of the command; performing facial recognition of the image of the face or voice recognition of the command; and determining whether the user is authenticated based on performing the facial recognition of the image of the face or the voice recognition of the command.

In a fourth implementation, alone or in combination with one or more of the first through third implementations, process 800 may include determining that the particular action in the user activity data fails to correlate with the particular task; providing, to the client device, a request to provide a new action for satisfying the particular task; receiving, from the client device, information indicating the new action for satisfying the particular task; and causing the new action to be automatically implemented.

In a fifth implementation, alone or in combination with one or more of the first through fourth implementations, process 800 may include storing the user personalized data and the user activity data in a data structure that is updated based on user actions and feedback associated with performance of the user actions.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    receiving, by a device and from a client device associated with a user, user personalized data about the user and user activity data identifying tasks of the user and actions performed by the user in response to the tasks;
    performing, by the device, natural language processing on the user personalized data and the user activity data to generate processed textual data identifying the user personalized data, the tasks, and the actions;
    training, by the device, one or more machine learning models based on the processed textual data to generate one or more trained machine learning models that identify particular actions based on particular tasks;
    receiving, by the device and from the client device, a command identifying a particular task to be performed;
    processing, by the device, the command and the user activity data, with the one or more trained machine learning models, to determine whether a particular action in the user activity data correlates with the particular task; and
    performing, by the device, one or more actions based on the particular action and when the particular action in the user activity data correlates with the particular task, wherein performing the one or more actions comprises one or more of:
        providing, to the client device, instructions for performing the particular action,
        automatically causing the client device to perform the particular action,
        receiving and analyzing feedback associated with performance of the particular action, or
        retraining the one or more machine learning models based on the particular action and based on feedback associated with performance of the particular action.

2. The method of claim 1, wherein the command is a textual command and processing the command and the user activity data with the one or more trained machine learning models comprises:
    processing the textual command, with a first trained machine learning model of the one or more trained machine learning models, to identify an intended task of the textual command; and
    processing the intended task and the user activity data, with a second trained machine learning model of the one or more trained machine learning models, to determine whether a particular action in the user activity data correlates with the intended task.

3. The method of claim 1, wherein performing the one or more actions comprises one of:
causing the particular action to be automatically implemented; or
processing the particular action, with a natural language generation model, to convert the particular action into a natural language response and providing the natural language response to the client device.

4. The method of claim 1, wherein performing the one or more actions comprises:
automatically dispatching a robot, an unmanned vehicle, or a technician to perform the particular action; or
updating a data structure based on feedback associated with performance of the particular action,
wherein the data structure stores the processed textual data.

5. The method of claim 1, wherein the command is a text-based command and processing the command comprises:
performing natural language processing on the text-based command to identify an intent of text-based command.

6. The method of claim 1, further comprising:
receiving an image of a user-provided object prior to receipt of the command or with receipt of the command;
performing image recognition of the image of the user-provided object; and
determining whether the user is authenticated based on performing the image recognition of the image of the user-provided object.

7. The method of claim 1, wherein performing the one or more actions comprises:
automatically resizing a file system based on receiving a voice command indicating that the file system is not performing correctly.

8. A device, comprising:
one or more memories; and
one or more processors, communicatively coupled to the one or more memories, configured to:
receive, from a client device associated with a user, a command identifying a particular task to be performed;
process the command and user activity data identifying tasks of the user and actions performed by the user in response to the tasks, with one or more machine learning models, to determine whether a particular action in the user activity data correlates with the particular task,
wherein the one or more machine learning models are trained to identify particular actions based on:
particular tasks,
user personalized data about the user, and
the user activity data; and
perform one or more actions based on the particular action and when the particular action in the user activity data correlates with the particular task,
wherein the one or more processors, to perform the one or more actions, are to one or more of:
provide, to the client device, instructions for performing the particular action,
automatically cause the client device to perform the particular action,
receive and analyze feedback associated with performance of the particular action, or
retrain the one or more machine learning models based on the particular action and based on feedback associated with performance of the particular action.

9. The device of claim 8, wherein the one or more processors are further configured to:
determine that the particular action in the user activity data fails to correlate with the particular task; and
provide, to the client device, a request to provide a new action for satisfying the particular task.

10. The device of claim 9, wherein the one or more processors are further configured to:
receive, from the client device, information indicating the new action for satisfying the particular task; and
cause the new action to be automatically implemented.

11. The device of claim 9, wherein the one or more processors are further configured to:
receive, from the client device, information indicating the new action for satisfying the particular task;
update a data structure based on the new action and based on performance of the new action,
wherein the data structure stores the user activity data; and
retrain the one or more machine learning models based on the new action and based on feedback associated with performance of the new action.

12. The device of claim 8, wherein the user personalized data includes data identifying one or more of:
inbound email data associated with the user,
outbound email data associated with the user,
calendar data associated with the user,
browser history data associated with the user,
system data associated with the user,
software data associated with the user,
voice data associated with a voice of the user,
image data associated with a face of the user,
data identifying reasons for which the user communicates with other users,
data identifying frequent contacts of the user, or
data identifying an organizational hierarchy associated with the user.

13. The device of claim 8, wherein the one or more processors are further configured to:
store the user personalized data and the user activity data in a data structure that is updated based on user actions and feedback associated with performance of the user actions.

14. The device of claim 8, wherein the one or more machine learning models include one or more of:
a clustering model,
a decision tree model,
a k-means model,
a natural language processing model, or
a natural language generation model.

15. A non-transitory computer-readable medium storing instructions, the instructions comprising:
one or more instructions that, when executed by one or more processors, cause the one or more processors to:
receive, from a client device associated with a user, user personalized data about the user and user activity data identifying tasks of the user and actions performed by the user in response to the tasks;
perform natural language processing on the user personalized data and the user activity data to generate processed textual data identifying the user personalized data, the tasks, and the actions;

train one or more machine learning models based on the processed textual data to generate one or more trained machine learning models that identify particular actions based on particular tasks;

receive, from the client device, a command identifying a particular task to be performed;

process the command, with a first trained machine learning model of the one or more trained machine learning models, to identify an intended task of the command;

process the intended task and the user activity data, with a second trained machine learning model of the one or more trained machine learning models, to determine whether a particular action in the user activity data correlates with the intended task; and perform one or more actions based on the particular action and when the particular action in the user activity data correlates with the particular task, wherein the one or more instructions, that cause the one or more processors to perform the one or more actions, cause the one or more processors to one or more of:

provide, to the client device, instructions for performing the Particular action, automatically cause the client device to perform the particular action, receive and analyze feedback associated with performance of the particular action, or retrain the one or more machine learning models based on the particular action and based on feedback associated with performance of the particular action.

16. The non-transitory computer-readable medium of claim 15, wherein the one or more instructions, that cause the one or more processors to perform the one or more actions, cause the one or more processors to one of:

cause the particular action to be automatically implemented; or process the particular action, with a natural language generation model, to convert the particular action into a natural language response and providing the natural language response to the client device.

17. The non-transitory computer-readable medium of claim 15, wherein the one or more instructions, that cause the one or more processors to perform the one or more actions, cause the one or more processors to one or more of:

automatically dispatch a robot, an unmanned vehicle, or a technician to perform the particular action; or update a data structure based on the feedback associated with the performance of the particular action, wherein the data structure stores the processed textual data.

18. The non-transitory computer-readable medium of claim 15, wherein the one or more instructions, when executed by the one or more processors, further cause the one or more processors to:

receive an image of a face of the user prior to receipt of the command or with receipt of the command;

perform facial recognition of the image of the face or voice recognition of the command; and determine whether the user is authenticated based on performing the facial recognition of the image of the face or the voice recognition of the command.

19. The non-transitory computer-readable medium of claim 15, wherein the one or more instructions, when executed by the one or more processors, further cause the one or more processors to:

determine that the particular action in the user activity data fails to correlate with the particular task;

provide, to the client device, a request to provide a new action for satisfying the particular task;

receive, from the client device, information indicating the new action for satisfying the particular task; and cause the new action to be automatically implemented.

20. The non-transitory computer-readable medium of claim 15, wherein the one or more instructions, when executed by the one or more processors, further cause the one or more processors to:

store the user personalized data and the user activity data in a data structure that is updated based on user actions and feedback associated with performance of the user actions.

* * * * *